US010606705B1

(12) United States Patent
Janakiraman et al.

(10) Patent No.: US 10,606,705 B1
(45) Date of Patent: Mar. 31, 2020

(54) PRIORITIZING BACKUP OPERATIONS USING HEURISTIC TECHNIQUES

(71) Applicant: Veritas Technologies LLC, Mountain View, CA (US)

(72) Inventors: Viswesvaran Janakiraman, San Jose, CA (US); Ashwin Kumar Kayyoor, Sunnyvale, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 498 days.

(21) Appl. No.: 14/953,802

(22) Filed: Nov. 30, 2015

(51) Int. Cl.
*G06F 11/14* (2006.01)

(52) U.S. Cl.
CPC ...... *G06F 11/1451* (2013.01); *G06F 11/1464* (2013.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 7,596,570 B1* | 9/2009 | Emigh | G06F 11/1453 |
| 8,924,352 B1 | 12/2014 | Andruss et al. | |
| 2003/0177324 A1 | 9/2003 | Timpanaro-Perrotta | |
| 2009/0177728 A1* | 7/2009 | Pottenger | G06Q 30/0603 |
| | | | 709/201 |
| 2011/0313974 A1* | 12/2011 | Chen | G06F 11/1451 |
| | | | 707/654 |
| 2014/0279921 A1* | 9/2014 | Wolfgang | G06F 11/1458 |
| | | | 707/654 |
| 2014/0372384 A1 | 12/2014 | Long et al. | |
| 2015/0039619 A1* | 2/2015 | Zhang | G06F 16/93 |
| | | | 707/738 |
| 2015/0254021 A1* | 9/2015 | Hu | H04L 51/22 |
| | | | 710/55 |
| 2016/0004605 A1* | 1/2016 | Ahn | G06F 16/00 |
| | | | 707/679 |
| 2016/0019119 A1 | 1/2016 | Gupta | |
| 2016/0188700 A1 | 6/2016 | Kleinschnitz et al. | |
| 2016/0239486 A1 | 8/2016 | Bianchi et al. | |
| 2016/0335283 A1* | 11/2016 | Rabinovich | G06F 11/1448 |
| 2017/0078208 A1 | 3/2017 | Panin | |
| 2018/0285477 A1 | 10/2018 | Bik et al. | |

OTHER PUBLICATIONS

Janakiraman, Viswesvaran et al.; "Context-Driven Data Backup and Recovery" U.S. Appl. No. 15/085,222, filed Mar. 30, 2016; consisting of Specification, Claims and Abstract (31 pages); and Drawings (10 sheets).
Khurana, Udayan, University of Maryland, College Park, et al., "Efficient Snapshot Retrieval Over Historical Graph Data," Jul. 24, 2012; 13 pages.

* cited by examiner

*Primary Examiner* — Etienne P Leroux
(74) *Attorney, Agent, or Firm* — Campbell Stephenson LLP

(57) ABSTRACT

Various systems, methods, and processes to analyze datasets using heuristic-based data analysis and prioritization techniques to identify, derive, and/or select subsets with important and/or high-priority data for preferential backup are disclosed. A request to perform a backup operation that identifies a dataset to be backed up to a storage device is received. A subset of data is identified and selected from the dataset by analyzing the dataset using one or more prioritization techniques. A backup operation is performed by storing the subset of data in the storage device.

12 Claims, 15 Drawing Sheets

Data Analysis Table 505

| Dataset Field 510 | Prioritization Technique Field 515 | Threshold Field 520 | Threshold Fulfillment Field 525 | Additional Prioritization Technique To Apply Field 530 |
|---|---|---|---|---|
| Dataset 220(1) | Social Network | 50% | No | Topic Modeling |
| Dataset 220(2) | Social Network + Topic Modeling | 25% | Yes | None |
| Dataset 220(3) | Topic Modeling | 75% | No | Social Network |
| Dataset 220(4) | External Input | 100% | Yes | None |
| ... | ... | ... | ... | ... |
| Dataset 220(N) | Topic Modeling + Social Network | 35% | Yes | None |

FIG. 5A

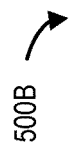

| Dataset Field 540 | Portion of Dataset Field 545 | Data Type Field 550 | Previous Analysis Field 555 | Threshold Met? 560 | New Analysis Field 565 | Include in Priority Subset? 570 | Inclusion Priority Level 575 |
|---|---|---|---|---|---|---|---|
| Dataset 220(1) | Subset 220(11) | Litigation | Topic Modeling | Yes | None | Yes | Platinum |
| | Subset 220(12) | Corporate | Graph Analysis | No | Topic Modeling | No | Silver |
| | Subset 220(13) | R&D | Cluster Analysis | No | Graph Analysis | Yes | Gold |
| Dataset 220(2) | Subset 220(21) | C-Suite | Multiple | Yes | Social Network | Yes | Platinum |
| | Subset 220(22) | Discovery | None | No | Multiple | Yes | Gold |
| | Subset 220(23) | Sales & Marketing | Social Network | No | Cluster Analysis | No | Silver |
| ... | ... | ... | ... | ... | ... | ... | ... |

Priority Subset Table 535

FIG. 5B

PRIORITIZING BACKUP OPERATIONS USING HEURISTIC TECHNIQUES

FIELD OF THE DISCLOSURE

The present disclosure relates to data backup operations and, more particularly, to optimizing data backup operations using heuristic techniques.

DESCRIPTION OF THE RELATED ART

Various types of backup software applications provided by one or more vendors can be used to perform backup operations. Backup operations are designed to protect an organization's data against loss and/or corruption. Therefore, backup operations are an integral part of an organization's data protection plan.

Typically, the purpose of implementing one or more backup operations is to create a copy of data (e.g., for storage) so that a particular file and/or application may be restored after the data is lost, corrupted, inadvertently deleted, etc. Modern backup software applications offer the ability to perform full backup operations, incremental backup operations, synthetic full backup operations, and various other types of backup operations.

Unfortunately, such backup operations do not take into consideration the importance (or the priority) of the data that is being backed up. For example, although an incremental backup operation backs up only data that has been changed and/or modified since a previous backup operation, performing the incremental backup operation copies (and stores) all changed and/or modified data—regardless of (and oblivious to) whether the changed and/or modified data is sufficiently important to warrant being backed up.

Given the urgency of some data protection scenarios (e.g., in the case of a natural disaster), determining whether the backup of particular data (e.g., important data) within a dataset should be expedited can be beneficial to the organization's data protection plan.

SUMMARY OF THE DISCLOSURE

Disclosed herein are systems, methods, and processes to optimize backup operations using heuristics. One such method involves receiving a request to perform a backup operation. The request identifies a dataset to be backed up to a storage device. The method selects a first subset of data from the dataset. The selecting includes analyzing the dataset by using one or more of prioritization techniques to the dataset, and identifying the first subset of data based on one or more results of the analyzing. The method then performs the backup operation by storing the first subset of data in the storage device.

In one embodiment, a first of the prioritization techniques includes one or more social network data analysis techniques that provide a first importance metric based on social network data associated with one or more social network data sources. A first of the one or more social network data analysis techniques, or a first combination of the one or more social network data analysis techniques, is used to analyze the social network data.

In some embodiments, a second of the prioritization techniques includes one or more topic modeling techniques that provide a second importance metric based on topic data associated with one or more topic data sources. A first of the one or more topic modeling techniques, or a first combination of the one or more topical modeling techniques, is used to analyze the topic data.

In other embodiments, a third of the prioritization techniques includes one or more cluster analysis techniques that provide a third importance metric based on clustered data associated with one or more clustered data sources. A first of the one or more cluster analysis techniques, or a first combination of the one or more cluster analysis techniques, is used to analyze the clustered data.

In certain embodiments, the first, the second, or the third of the prioritization techniques, in order of the first, the second, and the third, or in any combination or any order of the first, the second, or the third, is applied to the dataset.

In one embodiment, the method determines whether the first subset of data meets an importance threshold. The importance threshold is based on a relative measure, or on an absolute measure. In response to the first subset of data not meeting the importance threshold, the method re-analyzes the dataset using any combination of the first, the second, or the third of the prioritization techniques.

In some embodiments, selecting the first subset of data from the dataset includes receiving information indicative of one or more results of analyzing the dataset from another computing device, determining that the information indicative of the one or more results is associated with a portion of the dataset, and deriving (or identifying) the first subset of data based on the information. In this example, the dataset is analyzed by applying one or more of the prioritization techniques if the information is not associated with the portion, or if the information is not or cannot be received from another computing device.

In other embodiments, a second subset of data that includes one or more portions of the dataset not responsive to the analyzing is stored in the storage device for backup after the first subset of data is stored.

In certain embodiments, the method determines whether the request to perform the backup operation specifies a type of backup operation. In response to the type of backup operation being specified as an incremental backup operation or a synthetic full backup operation, and based on the analyzing, the method derives (or identifies) the first subset of data using only metadata and changed data associated with the first subset of data.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 5A is a data analysis table, according to one embodiment of the present disclosure.

FIG. 5B is a priority subset table, according to one embodiment of the present disclosure.

Figure 1:
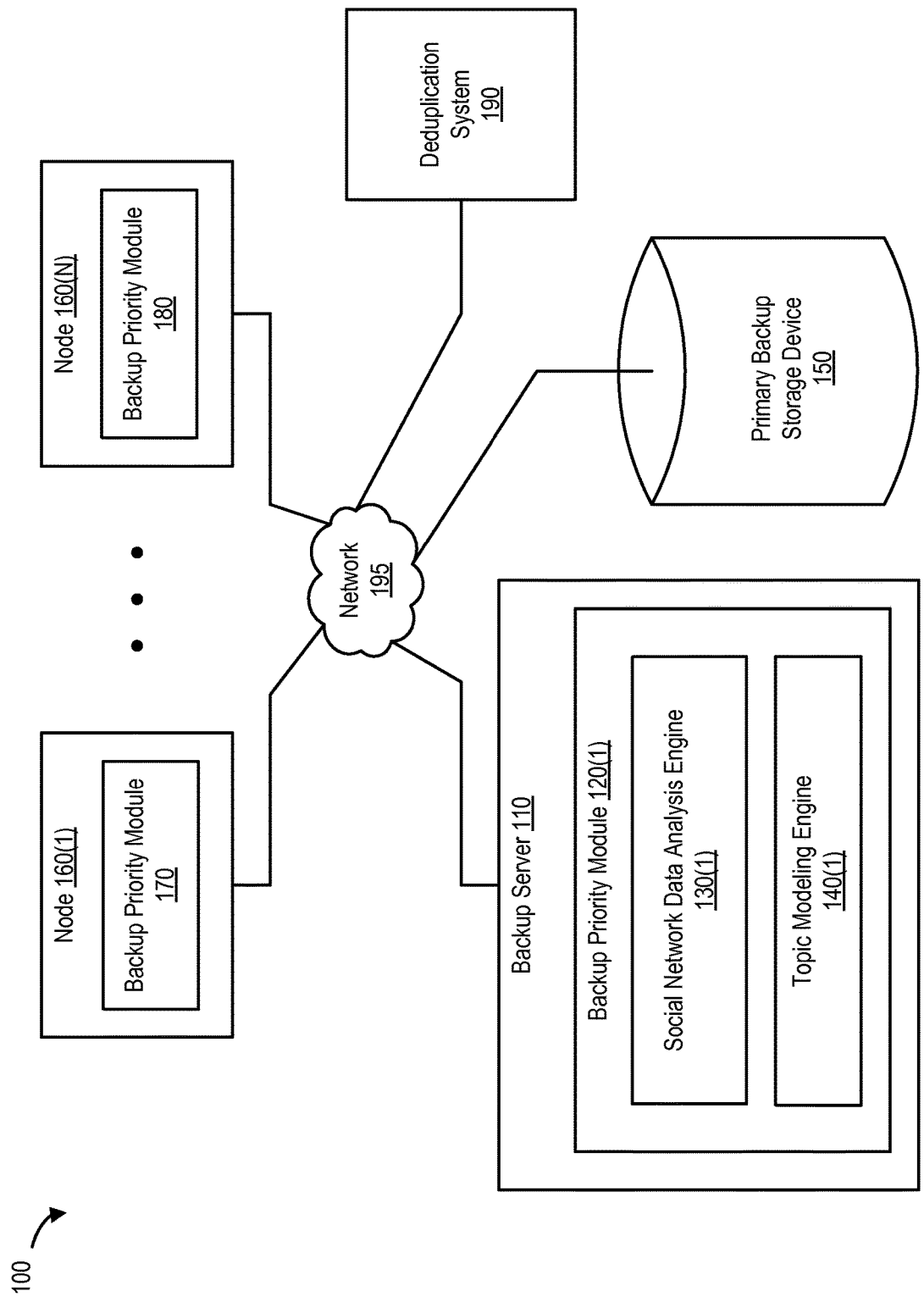
FIG. 1 is a block diagram of a computing system that performs backup operations based on data priority, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Data protection involves protecting high-priority and/or important data from loss, data corruption, or some other type of disaster. Important data is data that is of high-value (e.g., to a person or organization). High-priority data is data that is at risk of loss (e.g., from a natural disaster). Companies and organizations typically use commercially-available backup software applications to backup such high-priority and/or important data to one or more storage devices. For example, data can be backed up based on a backup policy or a backup schedule. A backup policy or backup schedule determines when (e.g., at a certain time each day, week, month, etc.) and what data (e.g., data from computer systems in the company's corporate headquarters, or data generated by the company's research and development group, etc.) should be backed up, and to where the data should be backed up (e.g., the identity and location storage device(s)).

As noted, backup software applications offer the ability to perform various types of backup operations. A first example is a full backup operation. A full backup operation makes a copy of all data to another set of media (e.g., a backup storage device). Because a full copy of all data is made, a full backup operation stores a complete copy of all data. A second example is an incremental backup operation that will result in copying only data that has changed (modified) since a previous (or last) backup operation. Therefore, an incremental backup operation copies less data than a full backup operation and thus, requires less storage space to store the backup. In a typical backup system, the backup software application executes on a backup server. The backup server receives one or more datasets to be backed up to a backup storage device (e.g., from node(s) and/or other computing device(s)). The backup software application then performs a backup operation and stores the dataset(s) in the backup storage device. In doing so, the backup system ensures data availability, if and when the dataset is needed.

When the backup software application performs the backup operation, the backup software application is unaware of (or agnostic to) the qualitative nature of the data that is being backed up. For example, a full backup operation stores a complete copy of all the data in question, and an incremental backup operation stores changes to the data. These backup operations the treat various data subsets (of the dataset received for backup) in the same manner The full backup operation backs up the entire dataset, and the incremental backup operation backs up only changes to the dataset. Therefore, existing backup software applications are oblivious to the qualitative nature of the data (e.g., evidenced by the data's content) when performing backup operations.

The importance and desirability of determining the qualitative nature of data in a dataset and performing backup operations based on such determinations has at least three underpinnings First, it will be appreciated that the volume of data generated by modern companies and organizations is constantly growing, thus requiring the expenditure of considerable financial resources (e.g., to operate storage centers, procure storage devices, and such). For example, provisioning data to users and/or applications from a Solid State Drive (SSD) is much more expensive than provisioning the same from a Hard Disk Drive (HDD), due to the higher cost of SSD (e.g., on a per-unit-of-storage basis). Backing up and storing data incurs a significant cost, and given the voluminous nature of data generated by modern computing systems, this cost is ever increasing. Therefore, backing up all data (e.g., in the case of a full backup operation) and/or all changed data (e.g., in the case of an incremental backup operation) without regard to the data's importance is inefficient.

Second, it will also be appreciated that providing data to users in a timely manner is an important consideration for modern companies and organizations. For example, an online banking customer will typically require speedy access to his or her account balance and recent transaction information (e.g., versus information regarding older transactions and other services). In this regard, the qualitative nature of data can be helpful in determining whether or not that data is critical and/or important. Consequently, a backup operation that backs up both high-importance and low-importance data in the same manner (e.g., without treating the higher-importance data differently) is inefficient (and potentially places that data at risk).

Third, it must be noted that performing any type of backup operation is time consuming (and resource intensive). Further, given the voluminous nature of data being generated by modern companies and organizations, an interruption (or failure) of a backup operation in the form of a power outage, natural disaster, network error, or the like, can lead to data unavailability and/or loss.

Therefore, a solution that addresses the foregoing issues would benefit from a backup process that recognizes important (or high-priority) data, and backs up that data first. For example, if a subset of data from a dataset (e.g., a dataset received for backup) can be identified as important data, the subset can be backed up to a faster storage device compared to another subset of data from the dataset that contains less-important data (which, for example, can be backed up to a slower storage device, thus saving more costly storage resources). Similarly, a subset of data from a dataset that includes banking data that is needed urgently by the aforementioned banking customer (e.g., versus another subset of data from the dataset that includes banking data related to old transactions not immediately needed by the customer) can be identified as important data that would benefit from being backed up first (e.g., as the result of performing some type of expedited and/or preferential backup operation).

Unfortunately, as noted, existing backup software applications do not take into consideration the importance (and priority) of the data that is being backed up. Also as noted, backing up 100% of a dataset in its entirety (e.g., in the case of a full backup operation), or even restricting this to only changed data (e.g., in the case of an incremental backup operation) is inefficient, storage (and network) resource intensive, and time consuming. Therefore, regardless of the type of backup operation being performed (e.g., a full backup operation, an incremental backup operation, and so on), preferentially backing up important and/or high-priority subset(s) of data using heuristic technique(s) (also referred to herein as data analysis techniques and/or prioritization techniques) provides more efficient and effective protection against data loss.

Examples of Priority-Based Data Backup Computing Environments

FIG. 1 is a block diagram of a computing system that performs backup operations based on data priority and importance, according to one embodiment. The computing system of FIG. 1 includes a backup server 110, nodes 160(1)-(N), deduplication system 190, and a primary backup storage device 150. Backup server 110 performs one or more (and one or more types of) backup operations, and can be any of a variety of different types of computing devices, including a server, personal computing device, laptop computer, cellular phone, or the like.

Backup server 110 is coupled to nodes 160(1)-(N) through network 195. Like backup server 110, nodes 160(1)-(N) can be any of a variety of different types of computing devices, including a server, personal computing device, laptop computer, net book, personal digital assistant, cellular phone, or the like. Backup server 110 and nodes 160(1)-(N) are also communicatively coupled to primary backup storage device 150 through network 195. Primary backup storage device can include one or more of a variety of different storage devices, including hard disks, compact discs, digital versatile discs, one or more solid state drives (SSDs) memory such as Hash memory, and the like, or one or more logical storage devices such as volumes implemented on one or more such physical storage devices.

Backup server 110, nodes 160(1)-(N), and all or part of primary backup storage device 150 can be integrated (e.g., where the primary backup storage device is coupled to a node's or a backup server's internal devices by an internal bus and is built within the same chassis as the rest of the node or the backup server) or separate. If separate, for example, nodes 160(1)-(N), backup server 110, and primary backup storage device 150 can be coupled by a local connection (e.g., using a technology such as Bluetooth™, Peripheral Component Interconnect (PCI), Small Computer System Interface (SCSI), or the like) or via one or more networks such as the Internet, a local area network (LAN), or a storage area network (SAN).

Figure 2B:
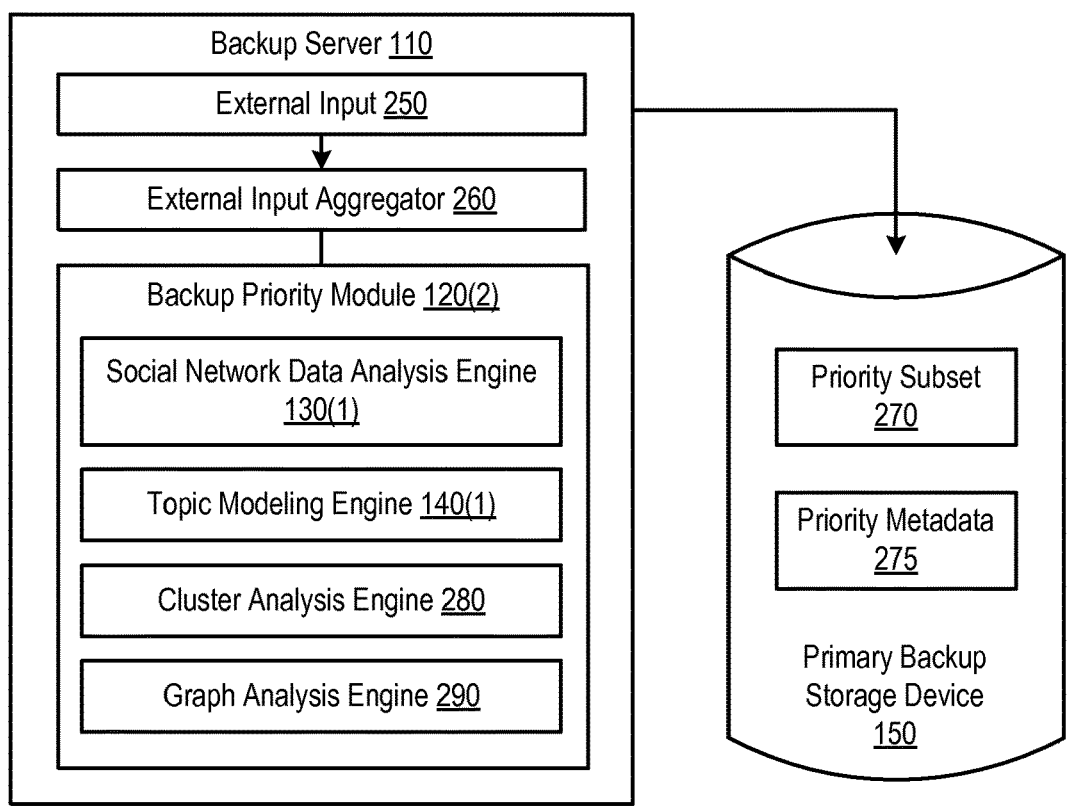
FIG. 2B is a block diagram of a backup server, according to one embodiment of the present disclosure.
Figure 3:
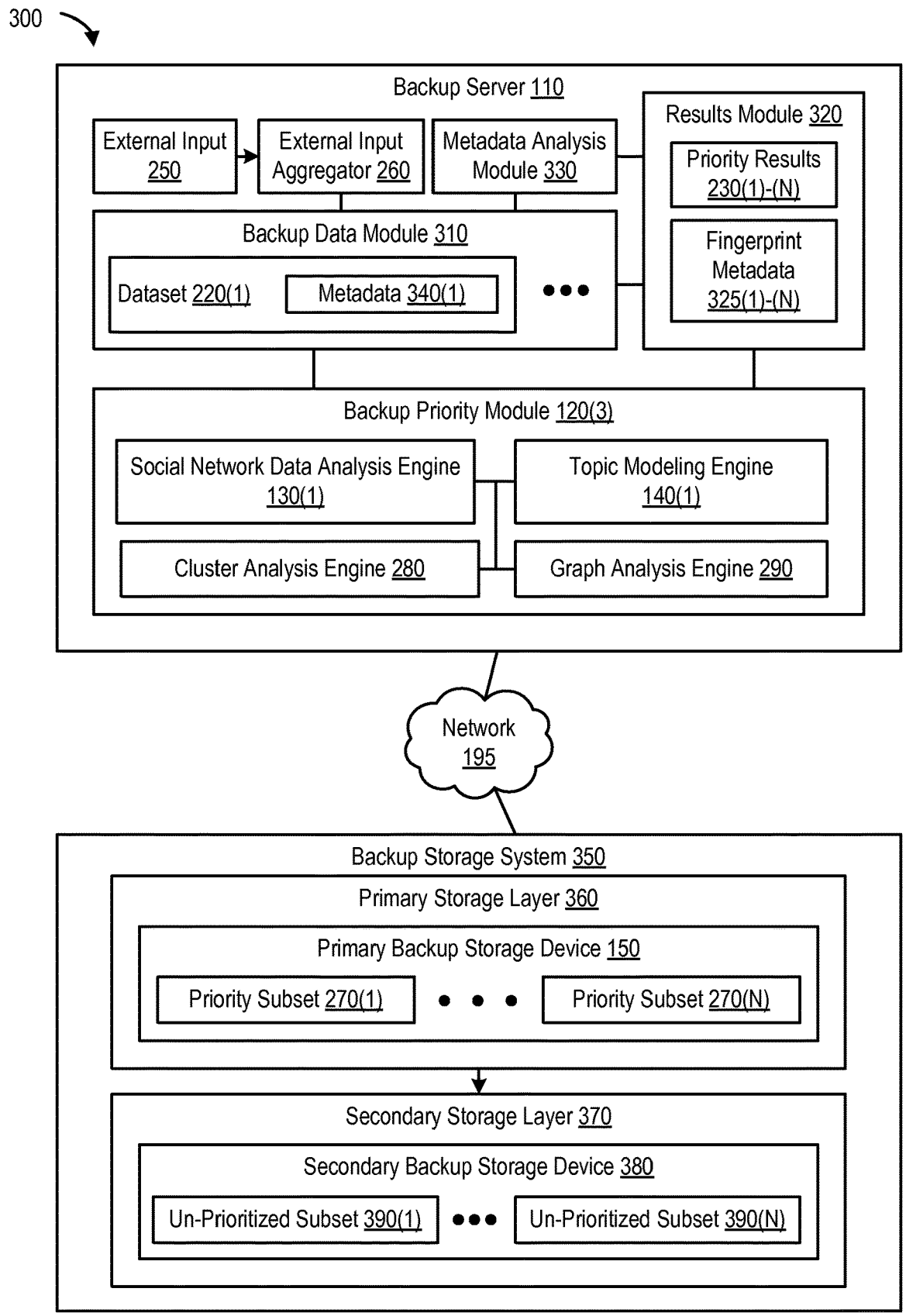
FIG. 3 is a block diagram of a backup server and a backup storage system, according to one embodiment of the present disclosure.
Figure 4:
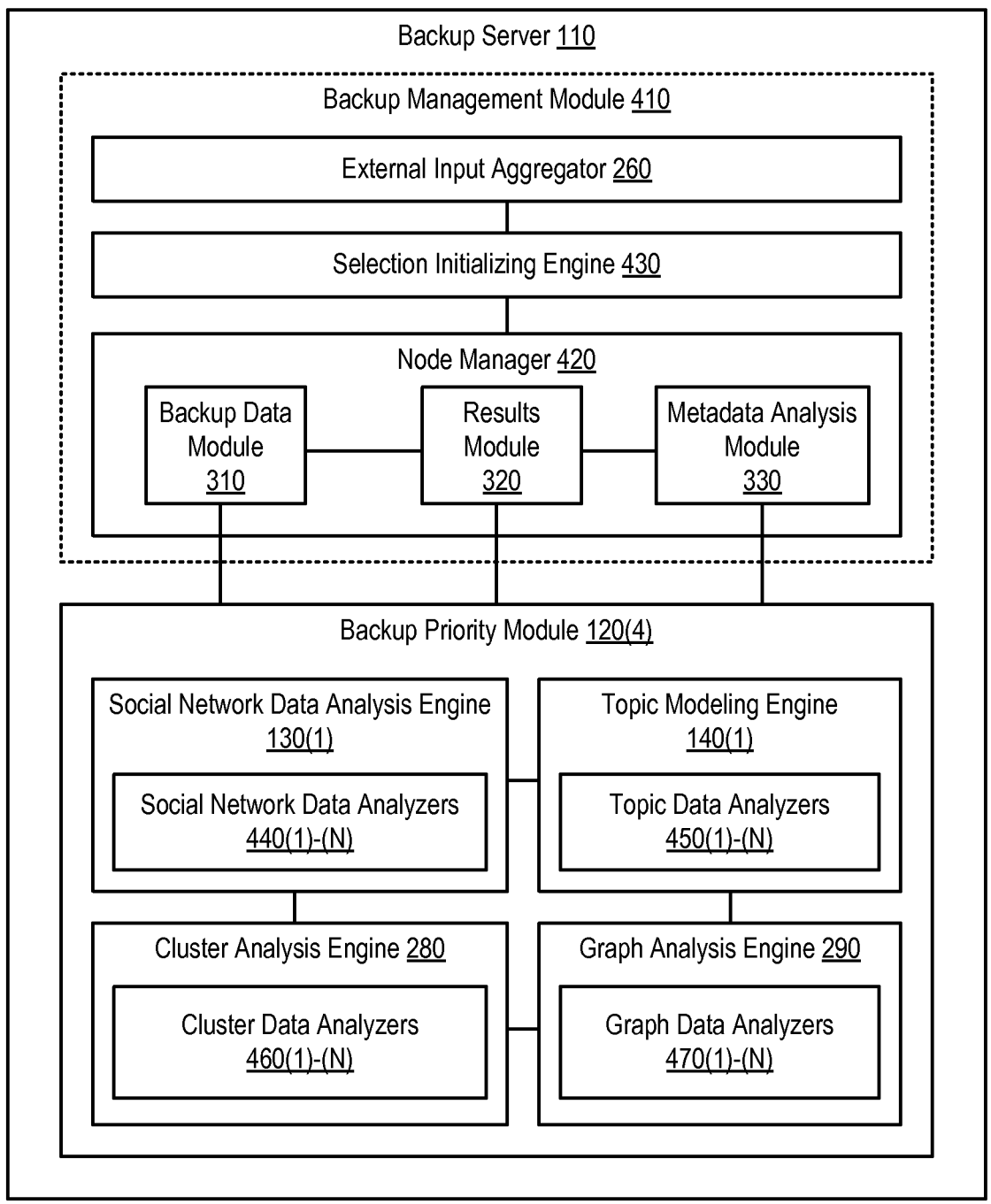
FIG. 4 is a block diagram of a backup server, according to one embodiment of the present disclosure.

As shown in FIG. 1, nodes 160(1)-(N) and backup server 110 include a backup priority module (e.g., shown in FIG. 1 as backup priority module 120(1) in backup server 110, and backup priority modules 170 and 180 in nodes 160(1) and 160(N), respectively). In one embodiment, backup priority modules 120(1), 170, and 180 are heuristics-based data analysis and prioritization modules. For example, backup priority module 120(1) can include a social network data analysis engine 130(1) and a topic modeling engine 140(1). However, a backup priority module can include various other data analysis and prioritization engines other than social network data analysis engine 130(1) and topic modeling engine 140(1) (e.g., backup priority modules 120(2), 120(3), and 120(4) as shown in FIGS. 2B, 3, and 4, respectively). Similarly, backup priority modules 170 and 180 can include one or more of a variety of data analysis and prioritization engines.

Figure 2A:
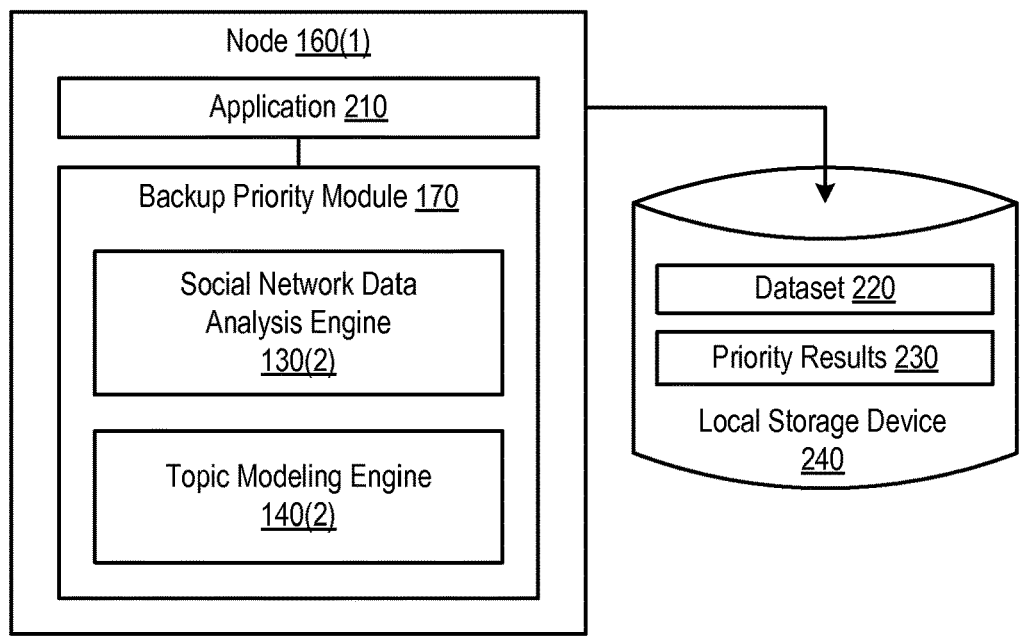
FIG. 2A is a block diagram of a node, according to one embodiment of the present disclosure.

FIG. 2A is a block diagram of a node that implements a backup priority module, according to one embodiment. As shown in FIG. 2A, application 210 executes on node 160(1). Node 160(1) also includes backup priority module 170, which further includes a social network data analysis engine 130(2) and a topic modeling engine 140(2). Node 160(1) is communicatively coupled to a local storage device 240. Local storage device 240 can include one or more of a variety of different storage devices, including hard disks, compact discs, digital versatile discs, solid state drives (SSDs) memory such as Flash memory, and the like, or one or more logical storage devices such as volumes implemented on one or more such physical storage devices. Local storage device 240 further stores one or more datasets (e.g., depicted as dataset 220 in FIG. 2A) and one or more priority results (e.g., depicted as priority results 230 in FIG. 2A). In this example, dataset 220 is generated by application 210 and is analyzed using social network data analysis engine 130(2) and/or topic modeling engine 140(2). Priority results 230 are generated by backup priority module 170 based on the results of the analysis performed by social network data analysis engine 130(2) and/or topic modeling engine 140(2), and then stored in local storage device 240 (e.g., by backup priority module 170). For example, social network data analysis engine 130(2) can use one or more data analysis techniques to analyze dataset 220 (e.g., if dataset 220 contains data from one or more social networks). Similarly, topic modeling engine 140(2) can use one or more data analysis techniques that implement one or more topic modeling methodologies to analyze dataset 220.

As shown in FIG. 2B (and in FIG. 1), backup server 110 can also implement a backup priority module. Therefore, a backup priority module can be implemented in (or by) one or more nodes (e.g., nodes 160(1)-(N)), in addition to one or more backup servers (e.g., backup priority module 120(1) in backup server 110). In FIG. 2B, backup server 110 implements backup priority module 120(2). Backup server 110 also includes an external input 250 and an external input aggregator 260. External input aggregator 260 is coupled to backup priority module 120(2). In addition to social network data analysis engine 130(1) and topic modeling engine 140(1), backup priority module 120(2) also includes a cluster analysis engine 280, and a graph analysis engine 290. For example, cluster analysis engine 280 can use (and implement) one or more cluster analysis techniques to analyze dataset 220. Similarly, graph analysis engine can use (and implement) one or more graph analysis techniques to analyze dataset 220.

Backup server 110, as shown in FIG. 2B, is communicatively coupled to primary backup storage device 150. Primary backup storage device 150 stores a priority subset 270 and priority metadata 275. Priority metadata 275 contains information associated one or more units of data in priority subset 270. As noted, a dataset generated by an application can be analyzed by using one or more heuristics-based data analysis engines included in backup priority modules 120(2) and/or 170 (among other possible types of data/cluster/graph analysis engines). In this example, priority subset 270 is identified by backup priority module 120(2) in backup server 110 and is stored in primary backup storage device 150. Priority subset 270 can be identified (and/or selected) based on priority results 230, or can also be selected (or identified) by analyzing dataset 220 using one or more the various data analysis engines included in backup priority module 120(2), one or more of which can be heuristics-based data analysis engines. In other examples, dataset 220 can be analyzed using non-heuristics-based data analysis engines (that implement such methodologies to provide importance/priority analysis and results).

External input 250 can be received by backup server 110 from one or more data sources that are not part of the computing system of FIG. 1 (e.g., from one or more nodes other than nodes 160(1)-(N), websites, third-party servers, and/or the like). For example, and in one embodiment, backup server 110 can receive external input 250 from the National Weather Service (e.g., from a computing device and/or server operated by the National Weather Service). This external input 250 can include information that can be used by backup priority module 120(2) to determine the urgency of identifying priority subset 270. Because backup server 110 can receive external inputs from a variety of disparate data sources (e.g., from a social network news feed, a terrorist threat level alert website, a weather warning information server, and other such sources), backup server 110 also includes external input aggregator 260. External input aggregator 260 aggregates external input(s) from multiple disparate data sources for analysis by backup priority module 120(2). Therefore, in addition to analyzing dataset 220 using social network data analysis engine 130(1), topic modeling engine 140(1), cluster analysis engine 280, and/or graph analysis engine 290, backup server 110 can also use and incorporate external input(s) (e.g., external input 250) as well as priority results 230 to select the data of the given dataset as priority subset 270 (or part of priority subset 270).

FIG. 3 is a block diagram of a backup server communicatively coupled to a backup storage system, according to one embodiment. Like the backup servers shown in FIGS. 1 and 2B, backup server 110 in FIG. 3 includes external input 250, external input aggregator 260, and backup priority module 120(3). Similarly, backup priority module 120(3) includes social network data analysis engine 130(1), topic modeling engine 140(1), cluster analysis engine 280, and graph analysis engine 290.

In one embodiment, backup server 110 receives a dataset from node 160(1) for backup. For example, and as shown in FIG. 3, backup data module 310 receives dataset 220(1) for backup (e.g., from node 160(1)). Dataset 220(1) also includes metadata 340(1). Metadata 340(1) includes ownership information, access time, size, permissions, and the like associated with dataset 220(1). Backup server 110 also includes a results module 320. Results module 320 includes priority results 230(1)-(N) and fingerprint metadata 325(1)-(N). In this example, results module 320 in backup server 110 accesses (or receives) priority results 230(1)-(N) from a local storage device associated with a node (e.g., local storage device 240 associated with node 160(1)) as shown in FIG. 2A). However, it should be noted that dataset 220(1) and metadata 340(1) can be processed (and analyzed) by node 160(1) and transferred to a backup storage system directly. Fingerprint metadata 325(1)-(N) can be used to identify priority results 230(1)-(N) associated with a particular dataset and associated metadata (e.g., metadata 340(1)), if that dataset is transferred directly from by node 160(1) to the backup storage system. In addition, fingerprint metadata 325(1)-(N) can also be used by backup priority module 120(3) to identify, determine, assign, and/or re-assign priority levels of various units of data in a subset, if that subset contains one or more units of data from a deduplicated dataset.

As shown in FIG. 3, backup server 110 is communicatively coupled to a backup storage system 350 via network 195. It is noted that any other appropriate network or interconnection can be used instead of and/or in addition to network 195. In one embodiment, backup storage system 350 is a hierarchical multi-layer storage system that includes multiple storage layers. For example, backup storage system 350 includes a primary storage layer 360 and a secondary storage layer 370. As shown, primary storage layer 360 includes primary backup storage device 150, and secondary storage layer 370 includes a secondary backup storage device 380. It is noted that backup storage system 350 can include more storage layers other than the storage layers shown in FIG. 3. For example, backup storage system 350 can include more than two storage layers. It is also noted that each of the storage layers can include more than one storage device. For example, secondary storage layer 370 can include other storage devices in addition to secondary backup storage device 380.

In some embodiments, dataset 220(1) can be deduplicated by a deduplication system (e.g., deduplication system 190 as depicted in FIG. 1). Each deduplicated dataset can contain one or more (deduplicated) units of data. Deduplication system 190 maintains fingerprint metadata 325(1)-(N) that tracks the number of copies of each deduplicated unit of data (e.g., in primary backup storage device 150). Consequently, when the deduplicated dataset is analyzed using one or more prioritization techniques, each subset that is identified can similarly contain one or more units of data (e.g., blocks, chunks, and so on), that have been deduplicated. In one embodiment, in addition to analyzing a deduplicated dataset to identify a subset, backup priority module 120(3) can determine that each unit of data within the identified subset (e.g., a subset with several deduplicated chunks or blocks of data) has a different level of priority.

For example, a (deduplicated) subset can contain one or more units data identified as high-priority. The same subset can contain one or more other units of data identified as medium-priority, low-priority, and so on. Backup priority module 120(3) can use fingerprint metadata 325(1)-(N) to identify these various units of data in the subset to determine (and, if necessary, re-assign) the priority level of the various deduplicated unit(s) of data in the subset (e.g., by re-assigning different priority levels to corresponding fingerprints of the unit(s) of data). For example, backup priority module 120(3) can access fingerprint metadata associated with each unit of data in the subset and determine the priority level for that particular unit of data (e.g., based on the fingerprint metadata itself, a Service Level Agreement (SLA), and the like). Further, backup priority module 120(3) can assign different priority levels to different units of data in a subset containing data from a deduplicated dataset by re-assigning different priority levels to corresponding fingerprints of the unit(s) of data. In one embodiment, backup priority module 120(3) can backup a subset of data containing unit(s) of data with a particular priority level (e.g., all unit(s) of data identified (or assigned) as high-priority). In another embodiment, priority levels of different unit(s) of data can also be averaged by backup priority module 120(3) to backup a subset based on priority level (e.g., a subset with a greater number of unit(s) of data determined to be high-priority can be backed up first, followed by a subset with a lower number of units(s) of data determined to be high-priority, and so on).

Examples of Selecting a Subset of Data for Backup

In one embodiment, backup server 110 receives a request to perform a backup operation (e.g., from node 160(1) or some other computing device, host, server, etc.). In this example, the request identifies a dataset (e.g., dataset 220(1)) to be backed up to a storage device (e.g., primary backup storage device 150, or secondary backup storage device 380). Instead of backing up the identified dataset as requested, backup server 110 (e.g., using backup priority module 120(3)) selects a first subset of data (e.g., a priority subset or to be part of a priority subset) from dataset 220(1).

Selecting the first subset of data from dataset 220(1) involves processing of dataset 220(1) by using one or more prioritization techniques. However, it should be noted that these prioritization technique(s) may have already been previously applied to dataset 220(1), for example, by node 160(1), and/or by some other computing device and/or user (e.g., at a geographically distant computing site/location). If backup priority module 120(3) has access to priority results 230(1), then backup priority module 120(3) may not have to apply the prioritization technique(s) to dataset 220(1) to identify the first subset of data. The results of the required analysis may already be included in priority results 230(1). Different priority rights (e.g., either at nodes 160(1)-(N)) or at backup server 110) can be used to decide whether (or not) one or more prioritization techniques should (or can) be used. For example, if nodes 160(1)-(N) are geographically dispersed, only some of the nodes may be at risk.

However, if backup priority module 120(3) does not have (or cannot gain) access to priority results 230(1) (e.g., priority results 230(1) are not available, have not been calculated, and/or cannot be accessed by backup priority module 120(3) because of data congestion, or the like), backup priority module 120(3) analyzes dataset 220(1) by applying one or more prioritization techniques to dataset 220(1) (e.g., by using one or more of social network data analysis engine 130(1), topic modeling engine 140(1), cluster analysis engine 280, and/or graph analysis engine 290, which are merely examples of such analysis and modeling engines). Based on one or more results of the analysis, backup priority module 120(3) identifies the first subset of data. Backup server 110 then performs the requested backup operation by storing only the first subset of data (e.g., in primary backup storage device 150).

The first subset of data from dataset 220(1) (e.g., the priority subset, or part of the priority subset) can be considered high-priority and/or important because the first subset of data is identified (and selected) only after dataset 220(1) is analyzed using one or more prioritization techniques. In one embodiment, because the first subset of data likely contains high-priority data (e.g., data that is at imminent risk from a natural disaster, or the like) and/or important data, a backup operation to store the first subset of data can be expedited (e.g., by overriding and/or ignoring a pre-scheduled backup operation). In addition, the first subset of data, likely being of high-importance and/or high-priority, can also be stored in a high-performance storage device (e.g., an SSD or other such primary backup storage device) for fast, efficient access and retrieval (e.g., during a restore operation).

FIG. 4 is a block diagram of a backup server that performs backup operations on subset(s) of data identified based on importance (and/or priority), according to one embodiment. As shown in FIG. 4, backup server 110 implements at least two modules that implement such functionality: a backup management module 410, and backup priority module 120(4). Backup management module 410 includes external input aggregator 250, a node manager 420, and a selection initialization engine 430. Node manager 420 includes backup data module 310, results module 320, and metadata analysis module 330.

Selection initialization engine 430 utilizes node manager 420 to select a dataset for backup. Once selected, the dataset can be analyzed by backup priority module 120(4), if needed, to identify (and select) a subset of data for backup. For example, node manager 420 identifies a dataset for backup using backup data module 310. External input aggregator 260 can be then activated to aggregate any available external input(s) associated with the dataset. If the dataset has been previously analyzed (e.g., using one or more data analysis techniques), node manager 420 obtains the result(s) of this analysis from results module 320. In addition, node manager 420 also accesses metadata associated with the dataset from metadata analysis module 330.

Examples of Analyzing a Dataset to Identify a Priority Subset for Backup

Once the dataset is selected for backup by backup management module 410, backup server 110 utilizes backup priority module 120(4) to select a subset of (or from) the dataset for backup. It should be noted that as used herein, a dataset and a subset of data (e.g., from the dataset) refer to and include one or more units of data (e.g., in the form of blocks, chunks, etc.). The present disclosure generally refers to datasets and subsets, but it is understood that these terms are not necessarily limited to any one type of unit of data. To the contrary, the operations described herein can utilize any logical or physical grouping of data.

As shown in FIG. 4, backup server 110 implements backup priority module 120(4) to select a subset of data for backup by analyzing a dataset identified for backup using one or more of a variety of data analysis techniques (also referred to herein as prioritization techniques). It must also be noted that although the present disclosure only refers to four prioritization techniques, backup priority module 120(4) can implement any number and/or any combination of prioritization engines and corresponding prioritization techniques to perform data analysis in addition to social network data analysis engine 130(1), topic modeling engine 140(1), cluster analysis engine 280, and/or graph analysis engine 290.

Social network data analysis engine 130(1), topic modeling engine 140(1), cluster analysis engine 280, and graph analysis engine 290 each perform a type of data prioritization analysis. For example, and as shown in FIG. 4, social network data analysis engine 130(1) includes social network data analyzers 440(1)-(N), topic modeling engine 140(1) includes topic data analyzers 450(1)-(N), cluster analysis engine 280 includes cluster data analyzers 460(1)-N), and graph analysis engine 290 includes graph data analyzers 470(1)-(N), respectively.

As noted, the first subset of data from dataset 220(1) can be considered high-priority and/or important because the first subset of data is identified (and selected) only after dataset 220(1) is analyzed using one or more prioritization techniques. In one embodiment, a first of the prioritization techniques includes one or more social network data analysis techniques that provide a first importance metric based on social network data associated with one or more social network data sources. As shown in FIG. 4, each social network data analyzer (e.g., social network data analyzer 440(1)) that is part of social network data analysis engine 130(1) refers to one (or a single) social network data analysis technique that analyzes social network data. In one example, social network data analyzer 440(1) can implement a N-Hop neighborhood analysis methodology to analyze social network data (e.g., from a social networking website, among other sources). For instance, a dataset containing a company's social network data can be analyzed by social network data analyzer 440(1) implementing N-Hop neighborhood analysis to identify a subset that contains data associated with a given set of executives who communicate frequently with each other, are part of the same corporate department, and so on.

In another example, social network data analyzer 440(2) can analyze social network data (e.g., from a social networking website, or from other data sources) based on a given user's social network circle (e.g., prioritized by family, friends, close friends, business contacts etc.). Social network analyzer 440(2) can generate a particular context associated with the user's social network data, and can then use this context to prioritize particular data objects (e.g., information regarding relationships, locations, contacts, activities performed etc.) based on this context (e.g., identify a subset of data that includes information indicating how a user is related to a certain number of people in his/her first circle of his/her larger social network). It will be appreciated that a single social network data analysis technique, or a combination of one or more social network data analysis techniques can be used to analyze social network data.

In some embodiments, a second of the prioritization techniques includes one or more topic modeling techniques that provide a second importance metric based on topic data associated with one or more topic data sources. As shown in FIG. 4, each topic data analyzer (e.g., topic data analyzer 450(1)) that is part of topic modeling engine 140(1) refers to one (or a single) topic data analysis technique that analyzes data to identify a subset of a dataset that includes topic(s) of importance. In one example, topic data analyzer 450(1) can implement a natural language processing (NLP)-based generative model methodology such as Latent Dirichlet allocation (LDA) to analyze data. For example, if a topic of importance includes the word (or topic) called "litigation," topic data analyzer 450(1) can implement an LDA-based methodology to analyze a dataset to determine whether a subset in the dataset with the word "litigation" is attributable to the (desired) subset's topic (of importance). Because a dataset can be a mixture of a number of disparate topics, a topic data analyzer such as LDA can be used to analyze a dataset to determine which subset from the dataset is responsive (or attributable) to that particular topic (e.g., "litigation").

In another example, topic data analyzers 450(2), 450(3), 450(4), etc. can each implement other NLP-based data analysis and prioritization techniques applicable to (and associated with) topic modeling such as Tokenization, N-Gram analysis, and Cosine (among others), respectively. It will be appreciated that a single topic modeling technique (e.g., LDA), or a combination of one or more topical modeling techniques (e.g., LDA, N-Gram analysis, Tokenization etc.), can be used to analyze topic data. For example, a given dataset can be analyzed using LDA to identify a subset based on a certain topic (e.g., "litigation" as noted above), in combination with a lexical analysis technique such as Tokenization to break up a given dataset into words, phrases, symbols, and the like (based on the topic of importance). In another example, a given dataset can be analyzed by a topic data analyzer implementing N-Gram analysis to identify a subset based on a contiguous sequence of n terms (e.g., a term of importance and/or priority) from a given sequence of text or speech.

In other embodiments, a third of the prioritization techniques includes one or more cluster analysis techniques that provide a third importance metric based on clustered data associated with one or more clustered data sources. Each cluster data analyzer (e.g., cluster data analyzer 460(1)) that is part of cluster analysis engine 280 refers to one (or a single) cluster analysis technique that analyzes data to identify a subset of a dataset that includes (or likely includes) high-priority and/or important data. In one example, cluster data analyzer 460(1) can implement K-means clustering to analyze data by utilizing vector quantization to prototype clustered data based on importance and/or priority (e.g., by partitioning n observations into k clusters, in which each observation belongs to the cluster with the nearest mean).

In another example, cluster data analyzers 460(2), 460(3), 460(4), etc. can each implement other cluster analysis techniques such as Density-based Spatial Clustering of Applications with Noise (DBSCAN), Balanced Iterative Reducing and Clustering using Hierarchies (BIRCH), Ordering Points to Identify the Clustering Structure (OPTICS), and SUBCLU (among others), respectively. It will be appreciated that a single cluster analysis technique (e.g., K-means), or a combination of one or more cluster analysis techniques (e.g., DBSCAN, BIRCH, SUBCLU, OPTICS, etc.), can be used to analyze clustered data. For example, a given dataset can be analyzed using cluster data analyzer 460(2) implementing DBSCAN to identify a subset (from the dataset) based on data that is closely packed together (e.g., data with data objects with several nearby data objects). In another example, cluster data analyzer 460(3) can implement a data mining methodology such as BIRCH to analyze a given dataset to perform hierarchical clustering based on multi-dimensional data points (e.g., to identify the subset). In yet another example, a given dataset can be analyzed using cluster data analyzer 460(4) implementing OPTICS to identify a subset in a density-based cluster containing one or more spatial datasets.

In certain embodiments, any of the prioritization techniques discussed above can be applied to a dataset individually, or in any other combination. The first, the second, or the third of the prioritization techniques can be applied to a dataset in order of the first, the second, and the third, or in any combination or any order of the first, the second, or the third. For example, the same dataset can be analyzed using either N-Hop neighborhood analysis, K-means clustering, LDA, or DBSCAN, or using a combination of one or more of the foregoing techniques (e.g., K-Means and DBSCAN).

As previously noted, providing important and/or high-priority data to users in a timely and effective manner is an important consideration for modern companies and organizations. While full backup operations (which make a copy of all data), and incremental backup operations (which make a copy of all changes to the data) result in 100% of data or 100% of changes being stored and backed up respectively, full and incremental backup operations, as previously noted, are time consuming and storage resource intensive. On the contrary, backing up only a subset of important and/or high-priority data (from a larger dataset), while not providing complete coverage of data backup as a given, results in a faster backup, where the backed up data likely includes important and/or high-priority data. Therefore, it must be noted that the prioritization techniques discussed herein can be used alone or in combination to derive, identify, and/or select a subset of data that meets an importance threshold (e.g., an importance threshold related to and associated with a company's or an organization's backup and data protection goal). In some embodiments, a phased approach can be implemented to derive, identify, and/or select the subset of data that meets the importance threshold. For example, a first subset of data from the dataset can be identified as a high priority subset, a second subset of data from the dataset can be identified as a medium priority subset, and a third subset of data from the dataset can be identified as a low priority subset. Backup priority module 120(4) can backup all subsets identified as high priority subsets first, followed by subsets identified as medium priority, and then finally, subsets identified as low priority.

Consequently, in one embodiment, backup priority module 120(4) determines whether the first subset of data meets an importance threshold. The importance threshold can be based on a relative measure or on an absolute measure. In one example, a dataset analyzed by backup priority module 120(4) can result in a subset of data that meets the importance threshold based on the relative measure (e.g., the subset of data likely contains important data required by customers but also contains data that is unimportant). But because the subset of data meets the importance threshold by virtue of containing some important data, the subset is backed up immediately upon completion of the analysis by backup priority module 120(4) (e.g., to an SSD or to primary backup storage device 150).

In another example, the relative measure of a subset of data identified from a dataset can also be based on the size of the subset of data that is identified. For instance, if the dataset to be backed up is 100 GB, the importance threshold of any identified subset based on a relative measure could be set (e.g., by a user and/or administrator) at 60 GB. For example, if the identified subset of data is 80 GB, it may not be beneficial (or even practical) in terms of potential time and resource consumption savings to backup only the subset of data, considering that backing up the entire dataset of 100 GB would not take much longer nor would consume significant additional computing resources.

On the other hand, an absolute measure of the importance threshold can indicate that a subset of data from the dataset should be backed up because the subset meets one or more absolute measures. For example, user and/or administrator inputs to backup priority module 120(4) can indicate that a subset of data should be backed up immediately upon being identified if that subset of data is identified as a result of containing a particular word (or words), certain topics, and the like, or is a result of being derived by the use of a particular prioritization technique (e.g., K-means). In addition, the subset of data can meet the importance threshold based on the absolute measure if the subset of data falls within a particular size limit when compared to the size of the dataset. For example, if the dataset to be backed up is 100 GB, any subset of data that is identified from the dataset that has a size between 10 GB and 30 GB can be automatically flagged for immediate (and/or expedited) backup, as a result of having met the importance threshold based on the absolute measure (e.g., size of the subset).

Therefore, if the (identified) subset does not meet the importance threshold, in one embodiment, backup priority module 120(4) re-analyzes the dataset (e.g., dataset 220(1)) using any combination of the first, the second, or the third of the prioritization techniques discussed above. For example, if after analyzing dataset 220(1) using K-means, dataset 220(1) does not meet the importance threshold (e.g., the subset identified from the K-means analysis results in a subset that is almost the same size as the dataset, or the subset identified falls below a certain size specified by an administrator, etc.), dataset 220(1) can be re-analyzed by backup priority module 120(4) using a combination of one or more prioritization techniques (e.g., using K-means and N-Hop neighborhood analysis in combination with LDA and DBSCAN) to ensure that any new subset that is identified (e.g., by the re-analyzing) meets the importance threshold.

In this regard, and in some embodiments, the first, the second, and the third importance metrics provided by the first (e.g., social network data analyzers), the second (e.g., topic data analyzers), and the third (e.g., cluster data analyzers) prioritization techniques discussed above, can each be used to determine whether an (identified) subset meets, or does not meet, the importance threshold (e.g., based on information provided by the first, the second, and the third importance metrics indicating that the subset contains data that causes the subset to meet or exceed one or more relative measures and/or absolute measures). In certain embodiments, one or more prioritization techniques can be used to winnow (or break up) results obtained from analyzing a given dataset using one or more other prioritization techniques.

In other embodiments, and as noted above, the first, the second, and the third importance metrics can also be aggregated to generate and assign a priority (or importance) score (e.g., from one to ten, one being the least important and ten being the most important) to every subset of data that is identified by backup priority module 120(4). For example, the priority score can be used by backup priority module 120(4) to determine how, when, and/or where a given subset should be backed up (e.g., whether such data is to be treated differently, expedited, given preferential treatment with respect to protective measures such as caching, and so on). For instance, if the priority score for a subset of data from the dataset is two, then backup priority module 120(4) can delay the backup of the subset, wait until one or more additional subsets are identified that have a higher priority score, and/or combine the subset with the priority score of two with another subset prior to performing the backup operation. Conversely, if the priority score for a subset of data identified by backup priority module 120(4) is nine or ten, backup priority module 120(4) can perform the backup operation and backup the subset immediately upon finishing the analysis to identify (and thus, select) the subset.

In certain embodiments, backup priority module 120(4) can also use historical information/data (e.g., in the form of an external input, or via any other mechanism) to determine which prioritization technique and/or which combination of prioritization techniques will likely result in a more preferable subset for backup purposes. For example, if the dataset identified for backup (e.g., by node 160(1)) contains important corporate data from the C-suite, the selection of one or more subsets from the dataset may involve analyzing the dataset using one or more topic modeling (prioritization) techniques. Therefore, for example, if a subsequent dataset is also received from a node that is associated with the important corporate data from the C-suite, one (or more) previously applied prioritization techniques can be automatically applied to the dataset (e.g., based on past information that can indicate which prioritization technique(s) result (or have resulted) in the most preferable (or optimized) subset (e.g., based on subset size, quality of information contained in the subset, time required to backup the subset, etc.)).

FIG. 5A is a table that illustrates a data analysis table using one or more prioritization techniques, according to one embodiment. For example, dataset 220(1) can be analyzed using one or more social network data analyzers 440(1)-(N). The threshold for backup can be set at 50%. If dataset 220(1) does not meet the threshold (e.g., a first subset of data from dataset 220(1) that is identified (and selected) by backup priority module 120(4) is, for example, 80% of the size of dataset 220(1)), backup priority module 120(4) can apply one or more additional (and/or different, un-used) prioritization techniques to dataset 220(1) (e.g., one or more topic data analyzers 450(1)-(N)) to identify and select another subset (e.g., priority subset) that meets the threshold and, can thus be backed up (e.g., a second subset of data from dataset 220(1) that can be backed up immediately, with priority and/or importance attached).

On the other hand, as another example, dataset 220(2) can be analyzed using one or more social network data analyzers 440(1)-(N) and/or one or more topic data analyzers 450(1)-(N). Because the threshold for backup is at 100%, the threshold has been met (e.g., a first subset of data from dataset 220(2) that is identified (and selected) by backup priority module 120(4) contains data that is 20% of the size of dataset 220(2) and dataset 220(2) is received from a node that is part of a company's C-suite), backup priority module 120(4) does not (and may not) have to apply any other additional prioritization techniques to dataset 220(2). Thus, one or more subsets from dataset 220(2) can be backed up immediately after either being received along with priority results that indicate that dataset 220(2) has been previously analyzed (and the analysis indicates that the threshold has been met) or upon analysis performed by backup priority module 120(4) that indicates that the threshold has been met.

In one embodiment, backup priority module 120(4) may not (or need not) have to perform any analysis using the available prioritization techniques. For example, and as shown in FIG. 5A, dataset 220(4) can be received by backup server 110 with external input 250. In this example, backup priority module 120(4) can simply identify (and select) subset(s) from dataset 220(4) that contain information that is associated in any manner with (or has some type of connection to) the external input (e.g., if external input 250 indicates that a company's research and development (R&D) facility that houses a datacenter is under the threat of flooding (or exposed to some other type of emergency), backup priority module 120(4) can simply backup any and all subsets of data from dataset 220(4) that are associated in any manner with the company's R&D facility without performing any additional analysis using any additional prioritization techniques).

In some embodiments, Service Level Agreements (SLAs) can be implemented to backup only certain subsets of data from a dataset. FIG. 5B is a table that illustrates a priority subset table, according to one embodiment. As shown in FIG. 5B, dataset 220(1) can include several subsets (e.g., subsets 220(11), 220(12), and 220(13)). In this example, the type of prioritization technique to be applied by backup priority module 120(4) to a given subset can be based on the qualitative nature (or the type) of data in a subset, and on one or more prioritization techniques previously applied to that dataset.

As shown in FIG. 5B, dataset 220(1) contains three different types of data (e.g., subset 220(11) with litigation data, subset 220(12) with corporate data, and subset 220(13) with R&D data)). Backup priority module 120(4) can apply different SLA-based requirements (criteria) to each subset of a given dataset based on the prioritization previously determined for that dataset (or subsets thereof). For example, if dataset 220(1) has already been analyzed using a first set of one or more prioritization techniques, backup priority module 120(4) can use the results of the previous analysis to apply a different set of one or more prioritization techniques to each of the subsets that are part of dataset 220(1). Determining which of the one or more prioritization techniques to apply (or whether any such different set is even necessary) can also be based on whether the previous analysis meets a given threshold. Further, each previously-analyzed subset of a dataset can be included in a new subset (e.g., a priority subset) based on a priority level (e.g., as indicated by the applicable SLAs).

In one embodiment, one or more subsets from disparate datasets can be combined (or aggregated) for identification, selection, and/or inclusion in the priority subset. For instance, if an SLA has a Platinum priority level, and a subset from a given dataset associated with that SLA meets a threshold (e.g., with or without the need for subsequent and/or additional analysis using one or more prioritization techniques), the subset can be combined (or aggregated) with other subset(s) from other dataset(s)) that also have a Platinum priority level and meet the threshold. Backup priority module 120(4) can then identify and select the combined (or aggregated) subsets as the priority subset for backup. The priority subset can then be stored in primary backup storage device 150.

Example Processes to Identify and Select Subset(s) for Backup

Figure 6A:
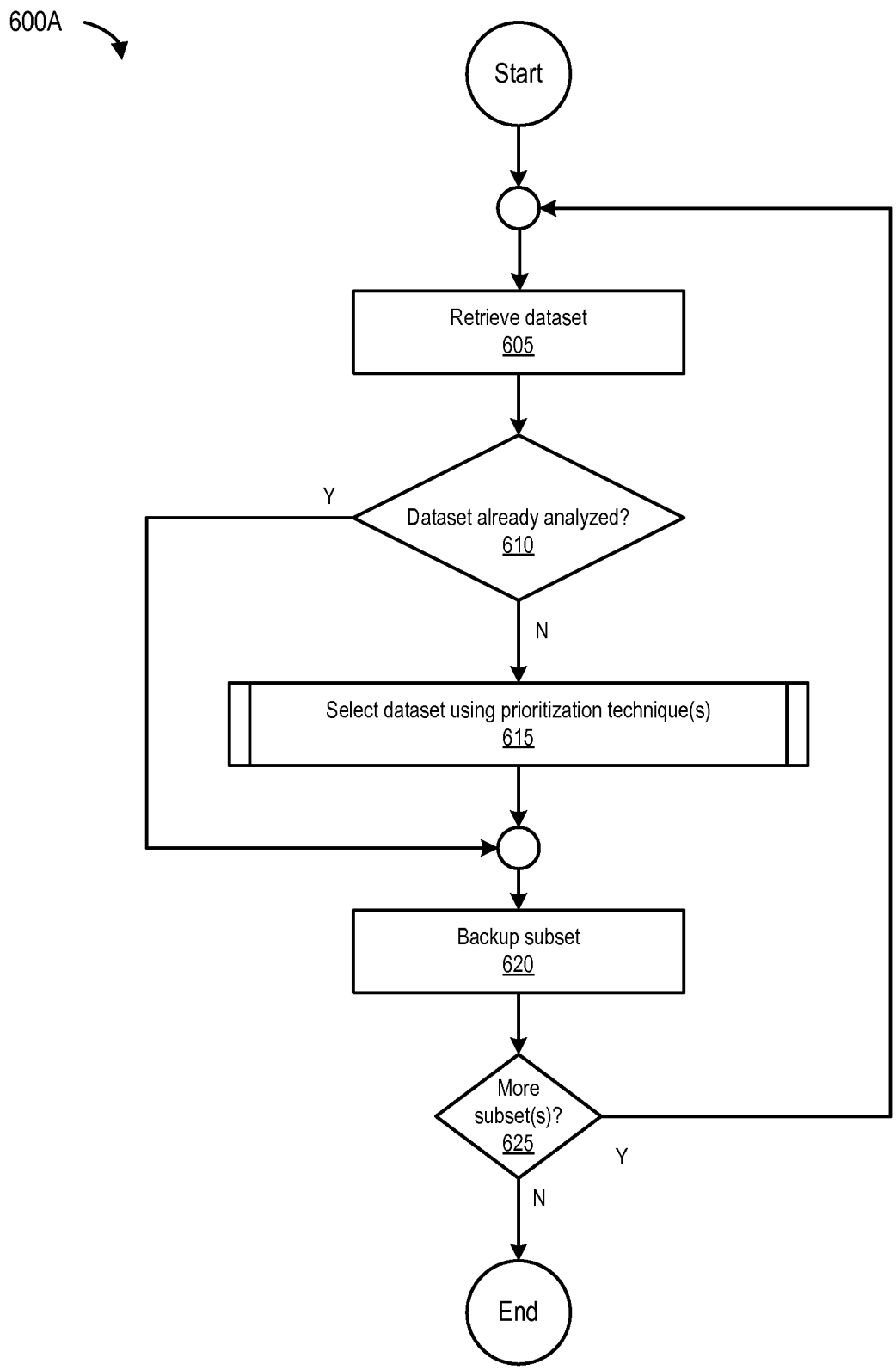
FIG. 6A is a flowchart that illustrates a process for backing up a subset of a dataset, according to one embodiment of the present disclosure.

FIG. 6A is a flowchart that illustrates a process for backing up a subset of data from a dataset, according to one embodiment. The process begins at 605 by retrieving a dataset (e.g., receiving a dataset from node 160(1), and/or accessing node 160(1) to copy the dataset). At 610, the process determines whether the dataset is (or has been) already analyzed (e.g., whether one or more prioritization techniques have previously been applied to the dataset as shown in FIG. 5B, and in FIG. 3 (as priority results 230(1)-(N))). If the dataset has not been (previously) analyzed, the process, at 615, selects the dataset using one or more (or a combination of one or more) prioritization techniques. At 620, the process backs up the subset (e.g., by storing the subset in primary backup storage device 150). The process ends at 625 by determining if there are any further subset(s) to backup.

In one embodiment, prior to backing up the subset, backup priority module 120(3) can determine whether primary backup storage device 150 and/or backup storage system 350 has excess (or even adequate) capacity to successfully perform the backup operation. Depending on the storage capacity of primary backup storage device 150 and/or backup storage system 350, the subset selected by backup priority module 120(3) can either be backed up or can be included in a backup schedule to be backed up at a later time/date (e.g., either on its own or with one or more other subset(s) of data).

In some embodiments, backup priority module 120(3) can also determine whether there is a size cutoff (e.g., a type of threshold) associated with primary backup storage device 150 and/or backup storage system 350, and/or a time cutoff (e.g., another type of threshold) associated with successfully performing the backup operation itself. Therefore, if the (selected and identified) subset cannot be successfully backed up within the time cutoff (e.g., as specified by a user and/or administrator, or in an SLA, etc.), the subset can be scheduled for backup at a later time/date, or if the (selected and identified) subset is larger than the size cutoff, the dataset can be analyzed again (e.g., re-analyzed using one or more new and/or un-used prioritization techniques that are different than the prioritization technique(s) used to perform the initial and/or the first analysis of the dataset).

Figure 6B:
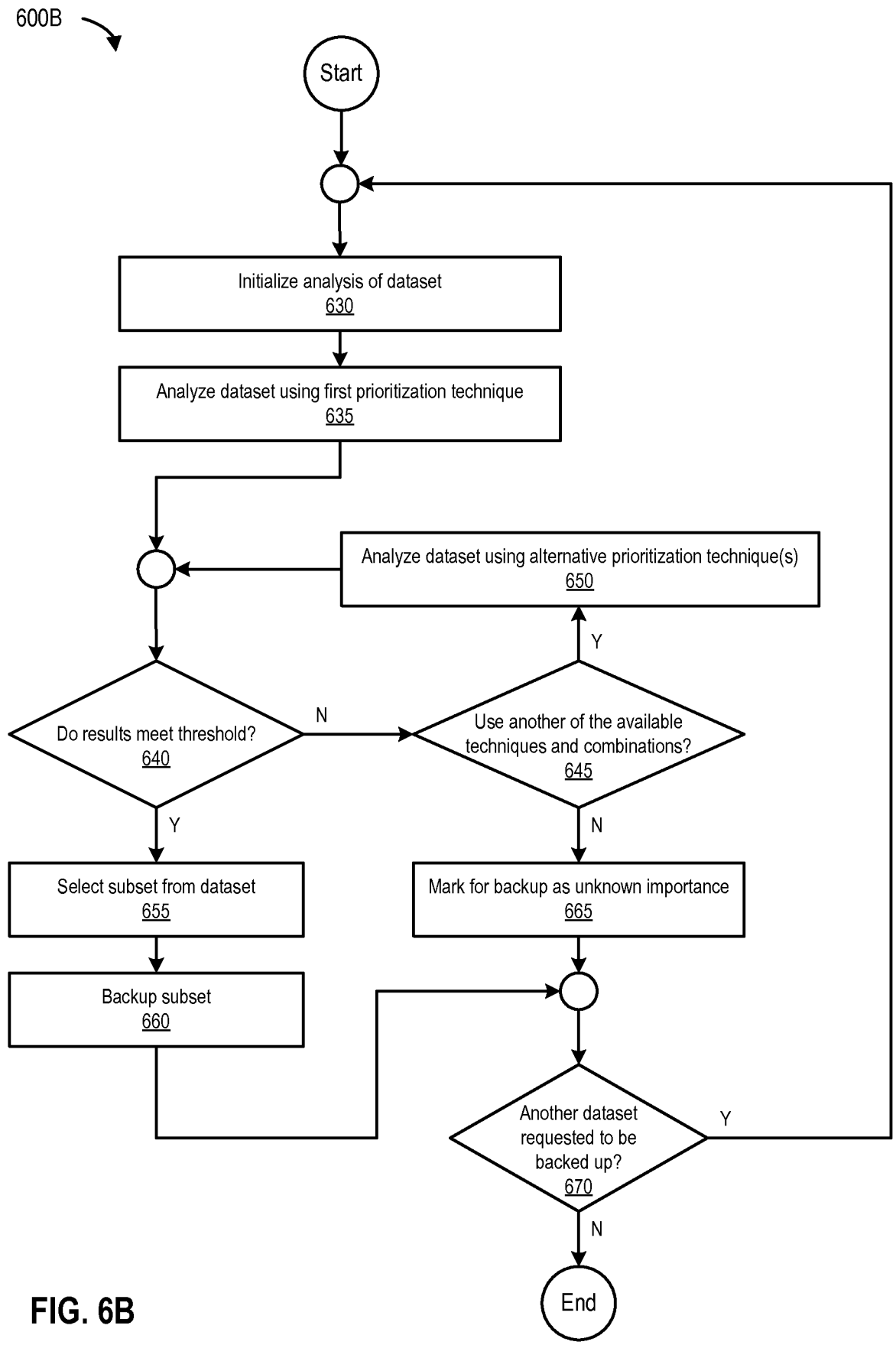
FIG. 6B is a flowchart that illustrates a process for analyzing a dataset, according to one embodiment of the present disclosure.

FIG. 6B is a flowchart that illustrates a process for analyzing a dataset, according to one embodiment. At 630, the process initializes analysis of a dataset (e.g., using selection initialization engine 430). At 635, the process analyzes a dataset using a first prioritization technique (e.g., using one or more social data analyzers 440(1)-(N), or one or more topic data analyzers 450(1)-(N)). At 640, the process determines whether the results (of the analysis) meets a threshold (or multiple thresholds) (e.g., whether the analysis identifies a certain type of data in the dataset, identifies a certain qualitative aspect/nature of data in the dataset, identifies a certain amount (e.g., based on size) of important data in the dataset, and so on; and/or whether any potential subset that will be identified and selected as a result of the analysis can be backed up within a given time period, using a certain amount of storage space on a storage device based on storage capacity, and so on). It will be appreciated that various other examples of such analysis are provided in FIGS. 5A, 5B, and 5C.

If the results do not meet the threshold, the process, at 645, determines whether there is a need to use another of the available prioritization techniques (and/or combinations of the available prioritization techniques). For example, the dataset can be re-analyzed as a result of external input 250, historical information, results of previous analysis, etc. (in addition to not meeting a threshold with a single/initial analysis). Therefore, at 650, the process re-analyzes the dataset using (one or more) alternative (e.g., un-used and/or new) prioritization techniques (or combinations thereof).

However, if the results do meet the threshold, the process, at 655, selects the subset from the dataset, and at 660, backs up the subset (e.g., by storing the subset in primary backup storage device 150). In addition, if the process determines that there is no need to use another (or more) of the available prioritization techniques, the process, at 665, marks the dataset for backup as having unknown importance. In this case, the dataset can be backed up at a later time, for example, to secondary backup storage device 380. At 670, the process ends by determining whether there are additional dataset(s) requested to be backed up.

Figure 6C:
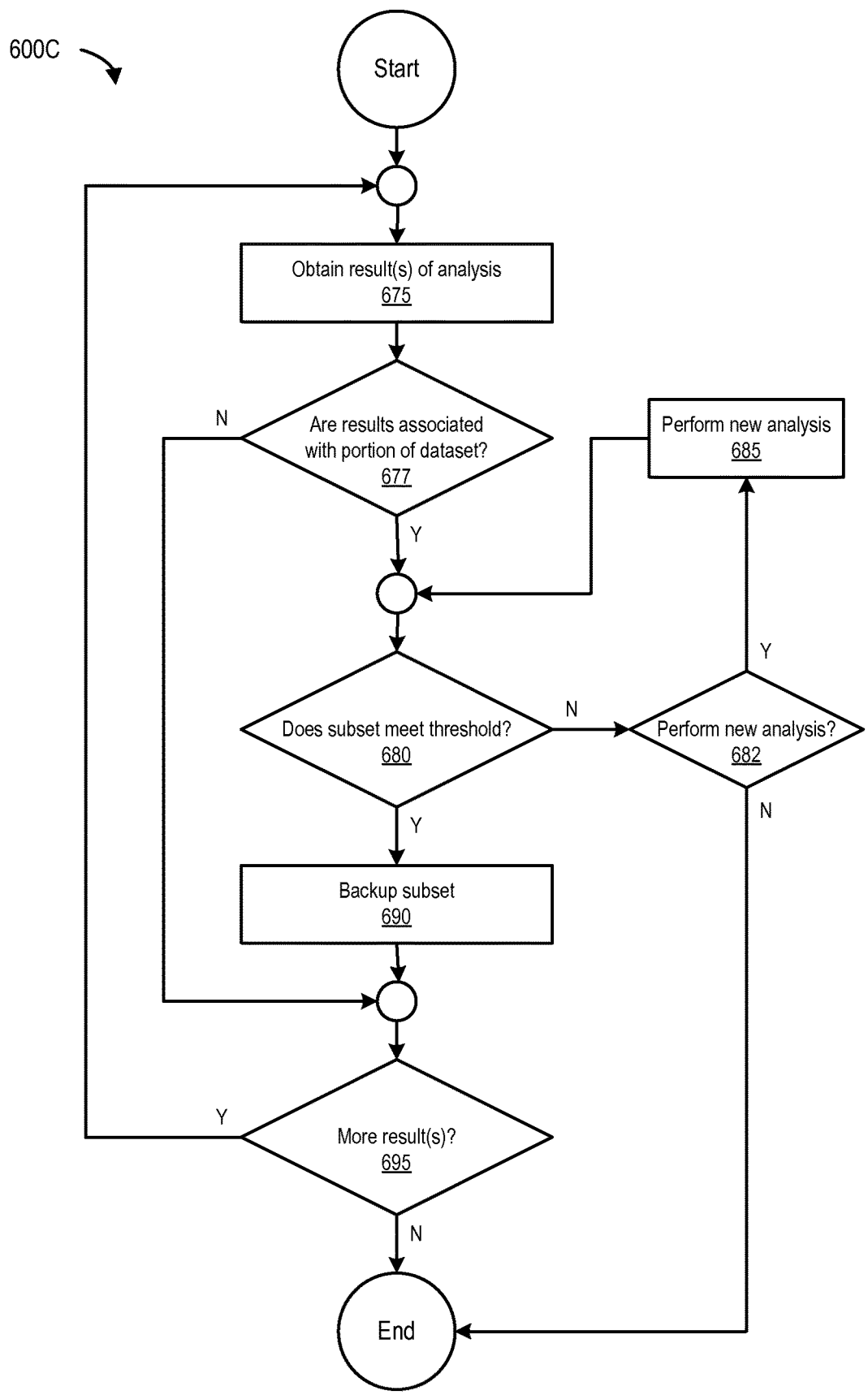
FIG. 6C is a flowchart that illustrates a process for backing up a subset of a dataset based on analysis results, according to one embodiment of the present disclosure.

As previously noted, the analysis of a dataset using one or more prioritization techniques can be performed by backup priority modules 120(4), or if the dataset has been previously analyzed, the results of the analysis can be processed by backup priority module 120(4) (e.g., by receiving priority results 230(1)-(N) using results module 320). FIG. 6C is a flowchart that illustrates a process for backing up a subset of data from a dataset, if the dataset has been previously analyzed, according to one embodiment. The process begins at 675 by obtaining (or receiving) results of analysis performed using one or more prioritization techniques (e.g., backup server 110 receives priority results 230(1)-(N) from node 160(1)).

At 677, the process determines whether the (received) results are associated with a portion of the dataset. For example, analysis results that are not associated with a dataset cannot be used to select a subset (from that dataset) as the dataset needs to be freshly analyzed by backup priority module 120(4). If the results are associated with a portion of the dataset, the process, at 680, determines whether the identified and selected subset meets a threshold. If the subset does not meet the threshold, the process, at 682, determines whether a new analysis (e.g., using one or more previously un-used prioritization techniques) should be performed. If a new analysis should be performed, the process, at 685, performs a new analysis.

However, if the subset meets the threshold, the process, at 690, backs up the subset (e.g., to primary backup storage device 150). The process ends at 695 by determining whether there are any additional results. In some embodiments, backup priority module 120 can request node 160(1) for results associated with a particular dataset received from node 160(1) (e.g., if node 160(1) for any reason does not send/transmit the results associated with the dataset (along with the dataset) to backup server 110 for backup).

In some embodiments, selecting a subset (e.g., the first subset of data from the dataset) includes receiving information (e.g., at backup server 110) indicative of one or more results (e.g., priority results 230(1)-(N)) of analyzing the dataset from another computing device (e.g., from node 160(1)). In this example, backup priority module 120(4) determines that the information indicative of the one or more results is associated with a portion of the dataset, and derives (and/or identifies) the subset (e.g., the first subset of data) based on the information. The dataset is analyzed by applying one or more of the prioritization techniques if the information is not associated with the portion, or if the information is not (or cannot) be received from another computing device for any reason (e.g., because of network and/or device failure, data unavailability, unreasonable amount of time required to receive the information, etc.).

Figure 7A:
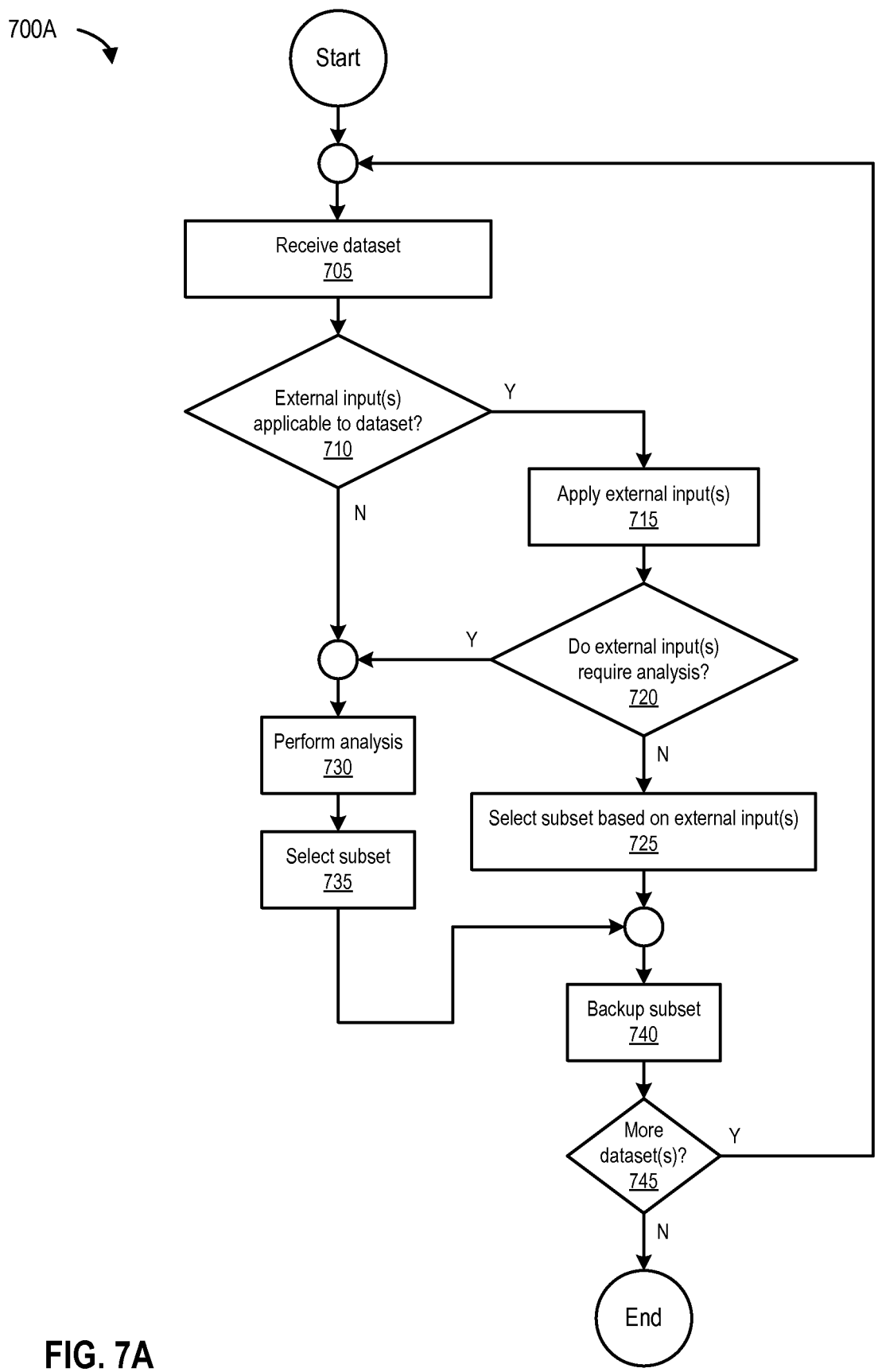
FIG. 7A is a flowchart that illustrates a process for identifying a subset of a dataset based on external inputs, according to one embodiment of the present disclosure.

FIG. 7A is a flowchart that illustrates a process for identifying a subset of a dataset based on external inputs, according to one embodiment. The process begins at 705 by receiving a dataset (e.g., from node 160(1) or some other computing device). At 710, the process determines whether one or more external inputs are applicable to the dataset. In one embodiment, the external input can be transmitted to backup server 110 from node 160(1) along with the dataset. In another embodiment, the external input can be received directly by backup server 110 from a third-party computing device (e.g., from a social network news feed, from a terrorist threat level alert website, a bad weather warning information server etc.). In yet another embodiment, the external input can be a user input specifying an SLA to be applied to the analysis of the dataset (e.g., in addition to one or more prioritization techniques).

If the external input(s) are applicable to the dataset, the process, at 715, applies the external input(s). At 720, the process determines whether the external input(s) require performing analysis using one or more prioritization techniques. For example, an external input can specify a particular prioritization technique to be applied to a dataset in identifying (and selecting) the subset. In another example, another external input can specify that subsets with certain types of data must be backed up immediately without further analysis (e.g., an external input from a National Weather Service server to backup server 110 can specify the location of a local storage device that is in the path of an oncoming hurricane as well as key words associated with datasets stored on the local storage device (e.g., data associated with a particular corporate executive, R&D team, etc.) from which backup priority module 120 can identify and derive the subset, and expedite the backup operation).

If external input(s) are not applicable to the dataset, the process, at 730, analyzes the dataset using one or more prioritization techniques, and at 735, selects a subset of data from the dataset based on the analysis. However, if external input(s) do not require analysis of the dataset, the process, at 725, simply selects a subset of data from the dataset based on the external input(s) (e.g., based on one or more key words, information specifying certain types of data, the location of the dataset, etc.). At 740, the process backs up the subset (e.g., to primary backup storage device 150), and ends at 745 by determining whether backup server 110 has received (or will receive) more datasets (e.g., from node 160(1) for backup).

Figure 7B:
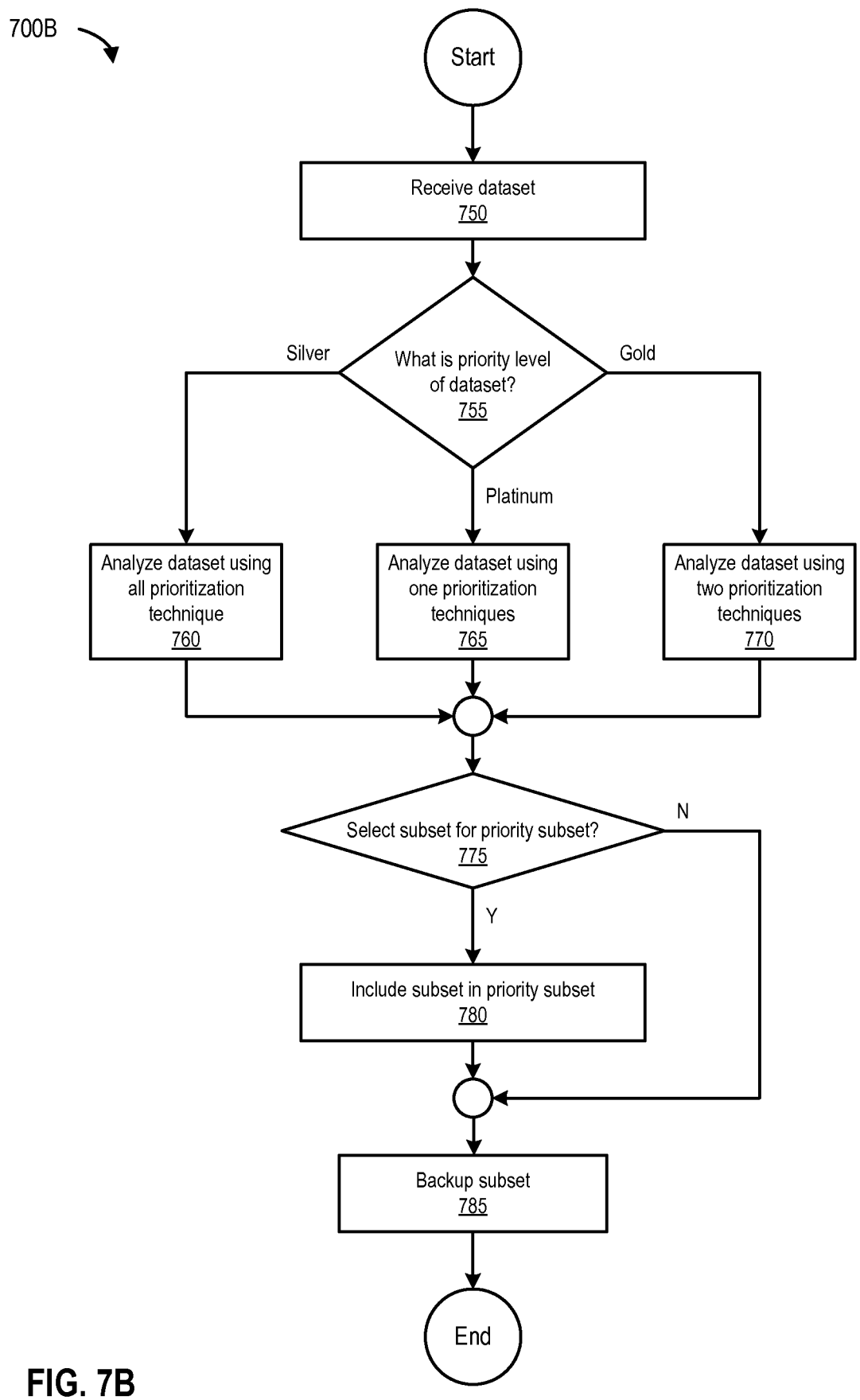
FIG. 7B is a flowchart that illustrates a process for analyzing a dataset based on the dataset's classification, according to one embodiment of the present disclosure.

FIG. 7B is a flowchart that illustrates a process for analyzing a dataset based on the classification of the dataset, according to one embodiment. As previously noted, one or more SLAs can be implemented to specify one or more criteria (or a priority level assigned to a particular dataset) to be used by backup server 110 in performing the identifying and selecting of the subset of data from the dataset. The process begins at 750 by receiving the dataset. At 755, the process determines the priority level of the dataset (e.g., as shown in FIG. 5B). If the priority level (e.g., specified in an SLA) is Silver, the process, at 760, analyzes the dataset using all available prioritization techniques.

However, if the priority level is Platinum or Gold, the process, at 765 and 770, analyzes the dataset using one prioritization technique or two prioritization techniques, respectively. As previously noted, the number of (or the type of) prioritization techniques to be applied can be based on user input, an SLA, historical information, priority results (e.g., results of prior analysis), and the like, or can be selected by backup priority module 120(4) (e.g., based on the type of data in the dataset, the qualitative nature of the dataset, the storage capacity of a primary backup storage device, and so on). At 775, the process determines whether the subset should be selected for inclusion in a priority subset (e.g., as shown in FIG. 5B). If the subset should be selected for inclusion in the priority subset (e.g., because the subset meets the threshold), the process, at 780, includes the subset in the priority subset. The process ends at 785 by backing up the priority subset (e.g., by storing the priority subset(s) in primary backup storage device 150 of primary storage layer 360 as shown in FIG. 3).

Figure 8A:
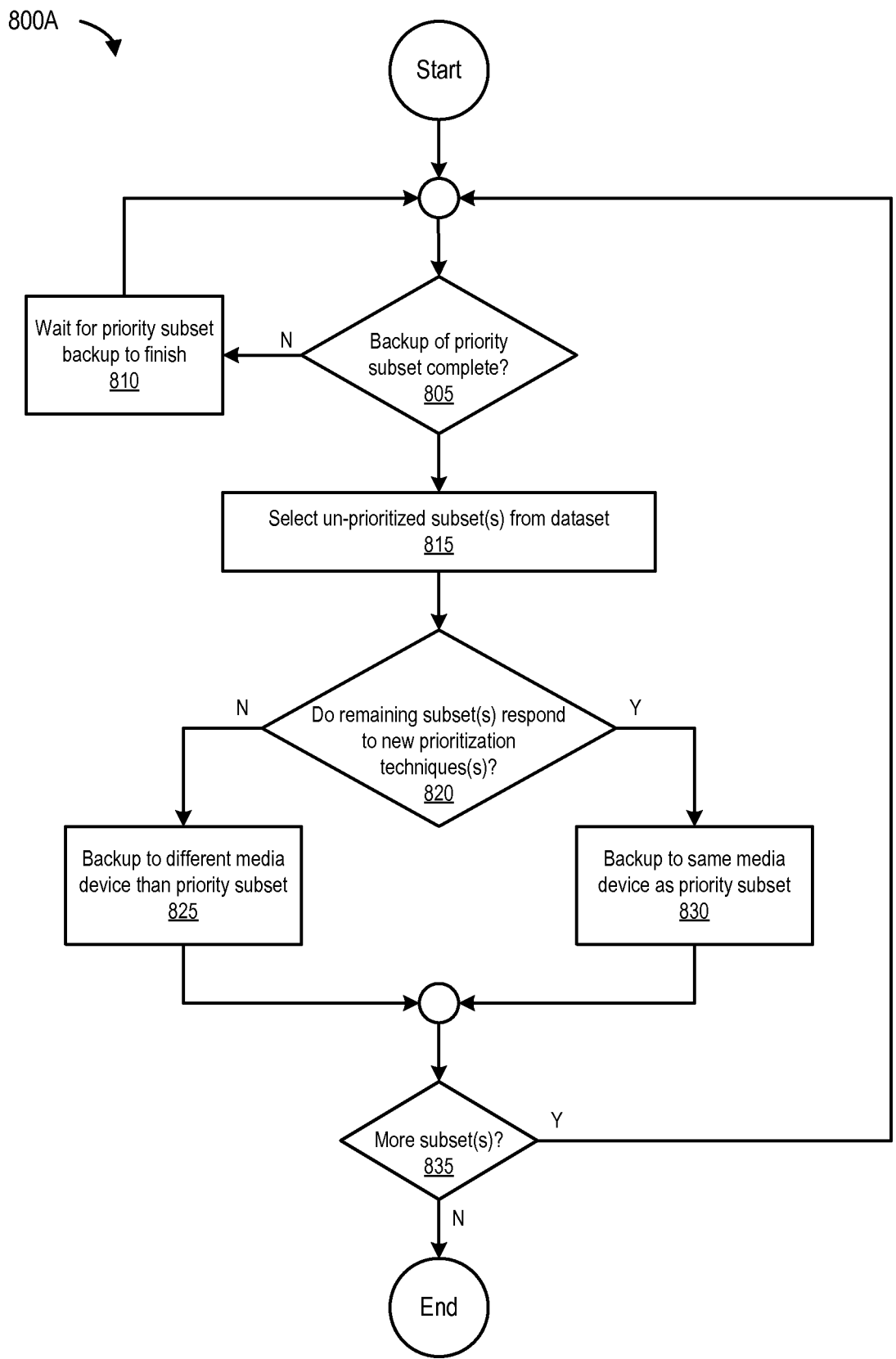
FIG. 8A is a flowchart that illustrates a process for backing up priority subsets, according to one embodiment of the present disclosure.

FIG. 8A is a flowchart that illustrates a process for backing up priority subsets, according to one embodiment. The process begins at 805 by determining whether the backup of a priority subset is complete. If the backup of the priority subset is incomplete, the process, at 810, waits for the priority subset backup to finish/complete. At 815, the process selects un-prioritized subset(s) from the dataset (e.g., one or more remaining subsets in the dataset other than the priority subset identified and selected by priority backup module 120(4)).

At 820, the process determines if remaining subset(s) respond to new prioritization techniques (e.g., one or more prioritization techniques that have not been applied to the priority subset). If the remaining subset(s) do not respond to one or more new prioritization techniques, the process, at 825, backs up the un-prioritized subset(s) to different media (e.g., a different storage media) than the media used to back up the priority subset. For example, if backup server 110 stores the priority subset(s) in primary backup storage device 150 of primary storage layer 360 of backup storage system 350, then the process stores the remaining subset(s) as un-prioritized subsets 390(1)-(N) in secondary backup storage device 380 of secondary storage layer 370 (e.g., as shown in FIG. 3).

However, if the remaining subset(s) respond to one or more new prioritization techniques, the process, at 830, backs up the un-prioritized subset(s) to the same media (e.g., primary backup storage device 150) used to back up the priority subset (e.g., priority subsets 270(1)-(N) as shown in FIG. 3). The process ends at 835 by determining whether there are more subset(s) to backup. In some embodiments, a second subset of data (e.g., an un-prioritized subset) that includes one or more portions of the dataset not responsive to the analyzing (e.g., applying one or more prioritization techniques does not result in a subset at all, or in a subset that meets a threshold) is stored in the backup storage system for backup after the first subset of data (e.g., the priority subset) is stored.

As shown in FIG. 8A, and as previously noted, different subsets of data from a given dataset can be stored in different storage media (e.g., based on the importance and/or priority of the subset). In some embodiments, primary storage layer 360 and secondary storage layer 370 represent a hierarchy of storage layers within backup storage system 350. For example, as shown in FIG. 3, priority subset(s) are stored in primary storage layer 360, and un-prioritized subset(s) are stored in secondary storage layer 370. In this example, and in one embodiment, primary backup storage device 150 is an SSD, and secondary backup storage device 380 is a HDD. However, in other examples, and in other embodiments, primary backup storage device 150 can simply be any storage unit (or storage device) that is faster than secondary backup storage device 380, and secondary backup storage device 380 can simply be any storage unit (or storage device) that has a larger storage capacity than primary backup storage device 150.

Figure 8B:
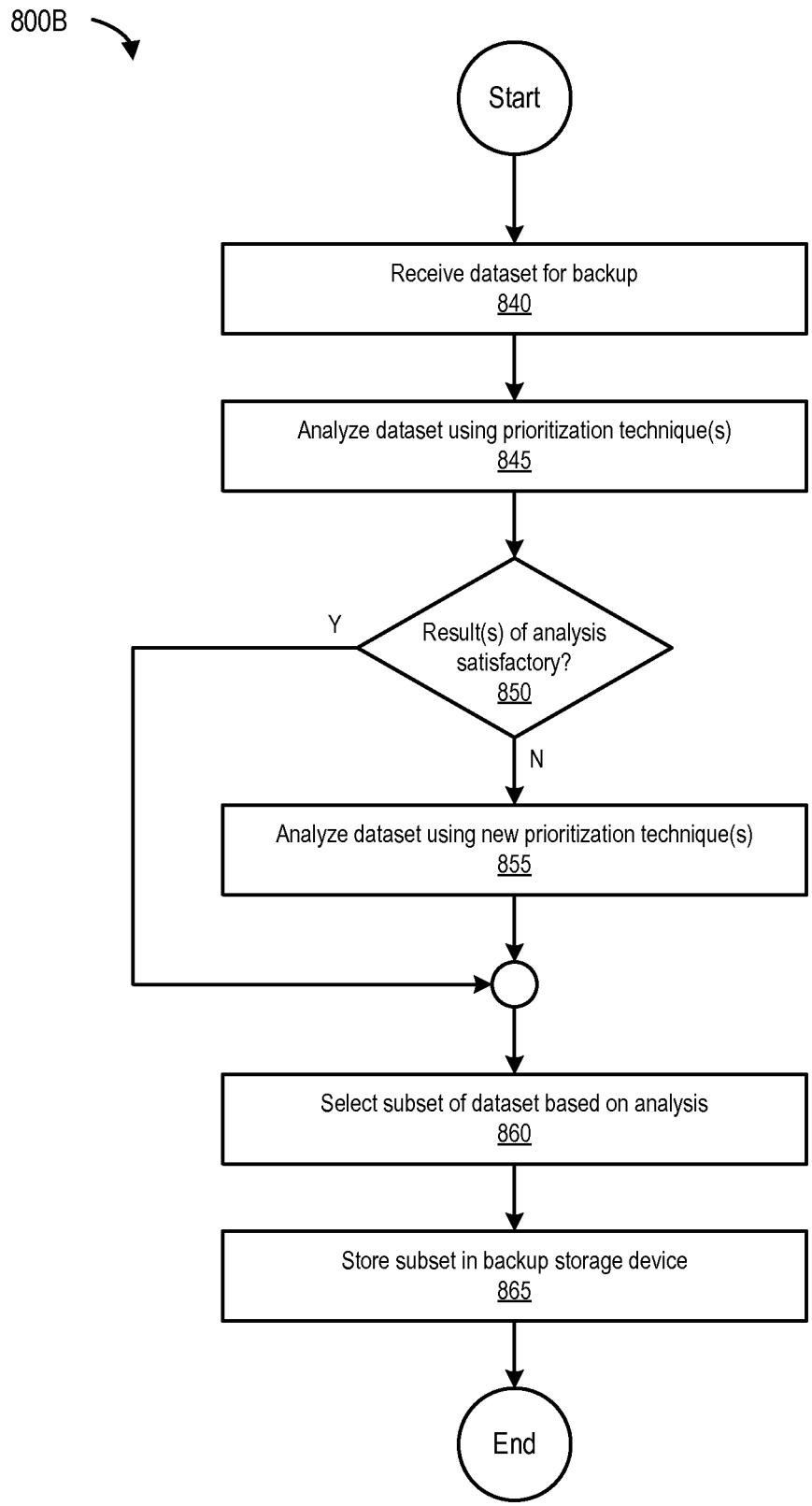
FIG. 8B is a flowchart that illustrates a process for storing a subset of a dataset in a backup storage device, according to one embodiment of the present disclosure.

FIG. 8B is a flowchart that illustrates a process for storing a subset of a dataset in a backup storage device, according to one embodiment. The process begins at 840 by receiving a dataset for backup. At 845, the process analyzes the dataset using prioritization technique(s). At 850, the process determines whether the results of the analysis are satisfactory. If the results of the analysis are not satisfactory, the process, at, 855, analyzes the dataset using new prioritization technique(s). At 860, the process selects a subset of data from the dataset based on the analysis, and ends at 865 by storing the subset in a backup storage device.

Therefore, it will be appreciated that, as opposed to selective backup methodologies (that require a user and/or administrator to manually select certain subsets of a dataset for backup—a tedious, laborious, and inefficient process to say the least), the methods, systems, and processes described herein automatically analyze one or more datasets (e.g., using one or more heuristic-based data analysis and prioritization techniques) to identify, derive, and/or select one or more subsets with important and/or high-priority data for preferential backup.

An Example Computing Environment

Figure 9:
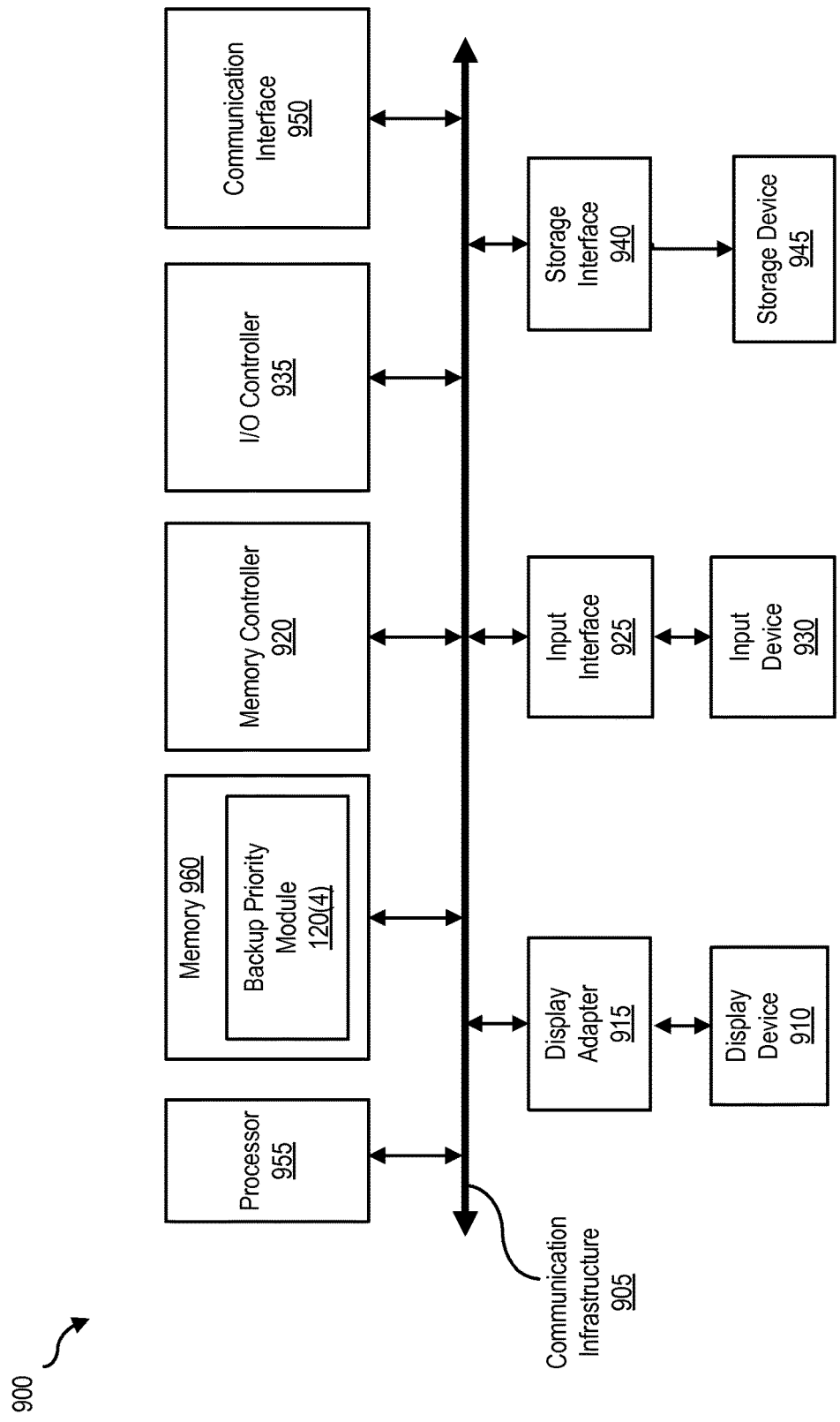
FIG. 9 is a block diagram of a computing system, illustrating how a backup priority module can be implemented in software, according to one embodiment of the present disclosure.

FIG. 9 is a block diagram of a computing system, illustrating how a backup priority module can be implemented in software, according to one embodiment of the present disclosure. Computing system 900 broadly represents any single or multi-processor computing device or system capable of executing computer-readable instructions. Examples of computing system 900 include, without limitation, any one or more of a variety of devices including workstations, personal computers, laptops, client-side terminals, servers, distributed computing systems, handheld devices, network appliances, storage controllers, and the like. Computing system 900 may include at least one processor 955 and a memory 960. By executing the software that implements backup server 100, computing system 900 becomes a special purpose computing device that is configured to analyze one or more datasets using one or more heuristic-based data analysis and prioritization techniques to identify, derive, and/or select one or more subsets with important and/or high-priority data for preferential backup.

Processor 955 generally represents any type or form of processing unit capable of processing data or interpreting and executing instructions. In certain embodiments, processor 955 may receive instructions from a software application or module. These instructions may cause processor 955 to perform the functions of one or more of the embodiments described and/or illustrated herein. For example, processor 955 may perform and/or be a means for performing all or some of the operations described herein. Processor 955 may also perform and/or be a means for performing any other operations, methods, or processes described and/or illustrated herein.

Memory 960 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 900 may include both a volatile memory unit and a non-volatile storage device. In one example, program instructions implementing a backup priority module 120(4) may be loaded into memory 960.

In certain embodiments, computing system 900 may also include one or more components or elements in addition to processor 955 and memory 960. For example, as illustrated in FIG. 9, computing system 900 may include a memory controller 920, an Input/Output (I/O) controller 935, and a communication interface 950, each of which may be interconnected via a communication infrastructure 905. Communication infrastructure 905 generally represents any type or form of infrastructure capable of facilitating communication between one or more components of a computing device. Examples of communication infrastructure 905 include, without limitation, a communication bus (e.g., Industry Standard Architecture (ISA), Peripheral Component Interconnect (PCI), PCI express (PCIe), or similar bus) and a network.

Memory controller 920 generally represents any type or form of device capable of handling memory or data or controlling communication between one or more components of computing system 900. For example, in certain embodiments memory controller 920 may control communication between processor 955, memory 960, and I/O controller 935 via communication infrastructure 905. In certain embodiments, memory controller 920 may perform and/or be a means for performing, either alone or in combination with other elements, one or more of the operations or features described and/or illustrated herein.

I/O controller 935 generally represents any type or form of module capable of coordinating and/or controlling the input and output functions of a computing device. For example, I/O controller 935 may control or facilitate transfer of data between one or more elements of computing system 900, such as processor 955, memory 960, communication interface 950, display adapter 915, input interface 925, and storage interface 940.

Communication interface 950 broadly represents any type or form of communication device or adapter capable of facilitating communication between computing system 900 and one or more additional devices. For example, in certain embodiments communication interface 950 may facilitate communication between computing system 900 and a private or public network including additional computing systems. Examples of communication interface 950 include, without limitation, a wired network interface (such as a network interface card), a wireless network interface (such as a wireless network interface card), a modem, and any other suitable interface. In at least one embodiment, communication interface 950 may provide a direct connection to a remote server via a direct link to a network, such as the Internet. Communication interface 950 may also indirectly provide such a connection through, for example, a local area network (such as an Ethernet network), a personal area network, a telephone or cable network, a cellular telephone connection, a satellite data connection, or any other suitable connection.

In some embodiments, communication interface 950 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 950 may also allow computing system 900 to engage in distributed or remote computing. Communication interface 950 may receive instructions from a remote device or send instructions to a remote device for execution.

As illustrated in FIG. 9, computing system 900 may also include at least one display device 910 coupled to communication infrastructure 905 via a display adapter 915. Display device 910 generally represents any type or form of device capable of visually displaying information forwarded by display adapter 915. Similarly, display adapter 915 generally represents any type or form of device configured to forward graphics, text, and other data from communication infrastructure 905 (or from a frame buffer, as known in the art) for display on display device 910.

As illustrated in FIG. 9, computing system 900 may also include at least one input device 930 coupled to communication infrastructure 905 via an input interface 925. Input device 930 generally represents any type or form of input device capable of providing input, either computer or human generated, to computing system 900. Examples of input device 930 include, without limitation, a keyboard, a pointing device, a speech recognition device, or any other input device.

As illustrated in FIG. 9, computing system 900 may also include storage device 945 coupled to communication infrastructure 905 via a storage interface 940. Storage device 945 generally represents any type or form of storage devices or mediums capable of storing data and/or other computer-readable instructions. For example, storage device 945 may include a magnetic disk drive (e.g., a so-called hard drive), a floppy disk drive, a magnetic tape drive, an optical disk drive, a flash drive, or the like. Storage interface 940 generally represents any type or form of interface or device for transferring and/or transmitting data between storage device 945, and other components of computing system 900.

In certain embodiments, storage device 945 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 945 may also include other similar structures or devices for allowing computer software, data, or other computer-readable instructions to be loaded into computing system 900. For example, storage device 945 may be configured to read and write software, data, or other computer-readable information. Storage device 945 may also be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from that shown in FIG. 9.

Computing system 900 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 900 for storage in memory via a network such as the Internet or upon a carrier medium.

The computer-readable medium containing the computer program may be loaded into computing system 900. All or a portion of the computer program stored on the computer-readable medium may then be stored in memory 960 and/or various portions of storage device 945. When executed by processor 955, a computer program loaded into computing system 900 may cause processor 955 to perform and/or be a means for performing the functions of one or more of the embodiments described and/or illustrated herein. Additionally or alternatively, one or more of the embodiments described and/or illustrated herein may be implemented in firmware and/or hardware. For example, computing system 900 may be configured as an application specific integrated circuit (ASIC) adapted to implement one or more of the embodiments disclosed herein.

An Example Networking Environment

Figure 10:
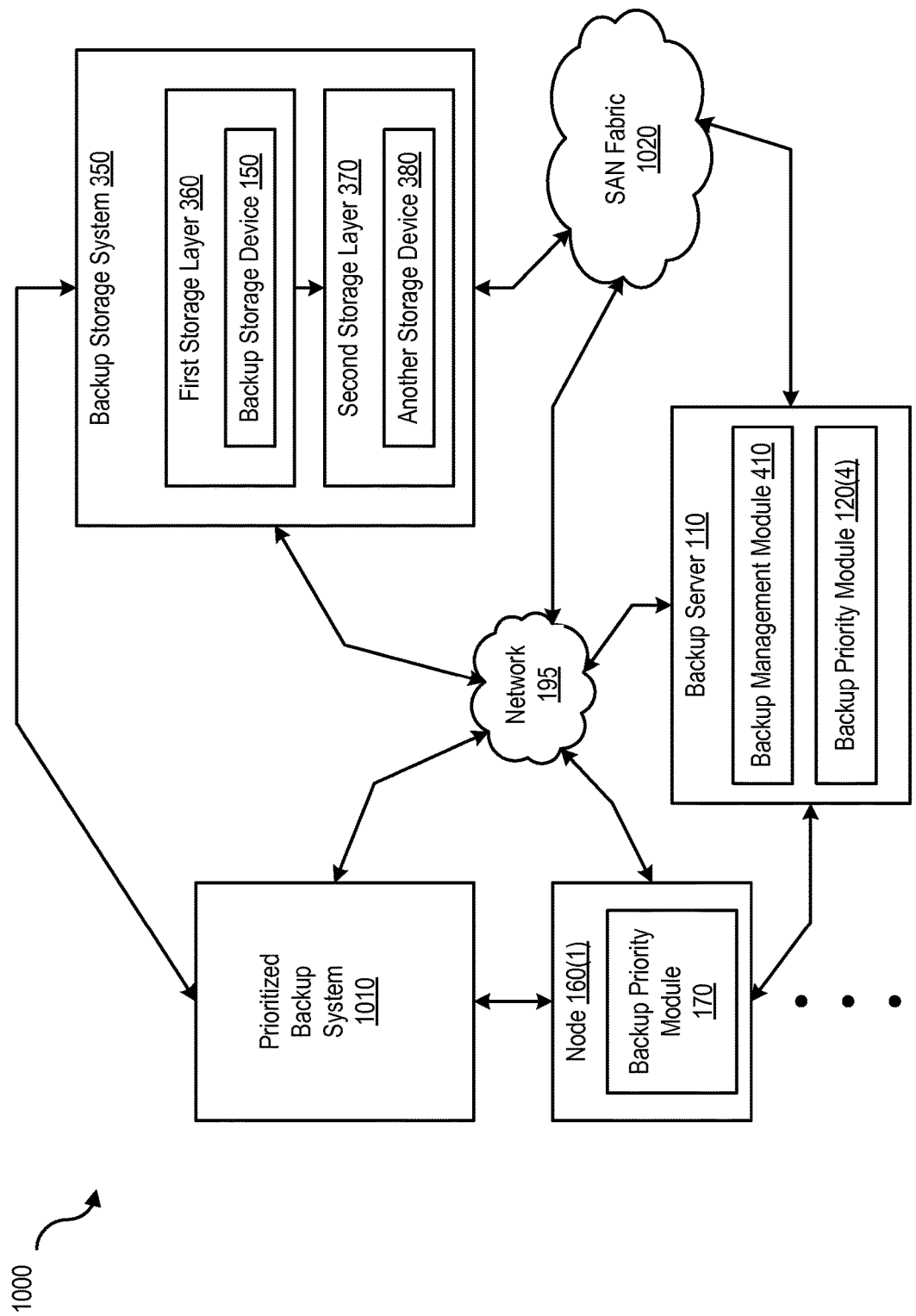
FIG. 10 is a block diagram of a networked system, illustrating how various devices can communicate via a network, according to one embodiment of the present disclosure.

FIG. 10 is a block diagram of a networked system, illustrating how various computing devices can communicate via a network, according to one embodiment of the present disclosure. In certain embodiments, network-attached storage (NAS) devices may be configured to communicate with backup server 110 using various protocols, such as Network File System (NFS), Server Message Block (SMB), or Common Internet File System (CIFS).

Network 195 generally represents any type or form of computer network or architecture capable of facilitating communication between multiple computing devices. Network 195 may facilitate communication between backup server 110 and backup storage system 350. In certain embodiments, and with reference to computing system 900 of FIG. 9, a communication interface, such as communication interface 950 in FIG. 9, may be used to provide connectivity between backup server 110 and network 195. It should be noted that the embodiments described and/or illustrated herein are not limited to the Internet or any particular network-based environment. For example, network 195 can be a Storage Area Network (SAN).

In at least one embodiment, all or a portion of one or more of the embodiments disclosed herein may be encoded as a computer program and loaded onto and executed by backup server 110 and nodes 160(1)-(N), or any combination thereof. In addition, all or a portion of one or more of the embodiments disclosed herein may also be encoded as a computer program, stored on backup server 110 and nodes 160(1)-(N), and distributed over network 195.

In some examples, all or a portion of the computing devices in FIGS. 1, 2A, 2B, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, backup server 110 and nodes 160(1)-(N) may transform behavior of a computing device, cluster, and/or server in order to cause the computing device, cluster, and/or server to analyze one or more datasets using one or more heuristic-based data analysis and prioritization techniques to identify, derive, and/or select one or more subsets with important and/or high-priority data for preferential backup.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving, at a computing system, a request to perform a backup operation, wherein the request identifies a dataset to be backed up to a storage device;
   selecting a first subset of data and a second subset of data from the dataset, wherein the first subset and the second subset each comprise a plurality of data units, and the selecting comprises
      analyzing the dataset by applying, to each of the first subset and the second subset, a social network data analysis technique, a topic modeling technique, and a cluster analysis technique, wherein
         the social network data analysis technique provides a first importance metric,
         the topic modeling technique provide a second importance metric, wherein the topic modeling technique is based, at least in part, on a natural language processing (NLP) methodology, and the cluster analysis technique provide a third importance metric, and the social network data analysis technique is based on social network data associated with one or more social network data sources that are distinct from the dataset, and the topic modeling technique and the cluster analysis technique are based on the dataset, determining an average priority level for each of the first subset and the second subset by averaging the first importance metric, the second importance metric, and the third importance metric, as each of those importance metrics are applied to each data unit in each respective subset, determining whether each of the first subset of data and the second subset of data meets an importance threshold, and determining that the first subset of data has a higher priority than the second subset of data based, at least in part, on a comparison of the average priority level for each of the first subset and the second subset; and performing the backup operation, wherein the backup operation comprises storing the first subset of data in the storage device prior to storing the second subset of data.

2. The computer-implemented method of claim 1, comprising:

the social network data analysis technique, the topic modeling technique, and the cluster analysis technique, are applied in order of the social network data analysis technique, the topic modeling technique, and the cluster analysis technique.

3. The computer-implemented method of claim 2, further comprising:

in response to determining that the first subset of data does not meet the importance threshold, re-analyzing the dataset using any combination of the social network data analysis technique, the cluster analysis technique, and the topic modeling technique.

4. The computer-implemented method of claim 3, wherein the importance threshold is based on a relative measure or an absolute measure.

5. The computer-implemented method of claim 1, wherein the selecting the first subset of data from the dataset further comprises:

receiving information indicative of one or more results of analyzing the dataset from another computing device;

determining that the information indicative of the one or more results is associated with at least a portion of the dataset; and deriving at least the first subset of data based on the information.

6. The computer-implemented method of claim 1, further comprising:

storing the second subset of data in the storage device for backup after storing the first subset of data, wherein the second subset of data comprises one or more portions of the dataset that are not responsive to the analyzing.

7. The computer-implemented method of claim 1, further comprising:

determining whether the request to perform the backup operation specifies a type of backup operation; and in response to the type of backup operation being specified as an incremental backup operation or a synthetic full backup operation, and based on the analyzing, deriving the first subset of data using only metadata and changed data associated with the first subset of data.

8. A non-transitory computer readable storage medium storing program instructions executable to perform a method comprising:

receiving, at a computing system, a request to perform a backup operation, wherein the request identifies a dataset to be backed up to a storage device;

selecting a first subset of data and a second subset of data from the dataset, wherein the first subset and the second subset each comprise a plurality of data units, and the selecting comprises analyzing the dataset by applying, to each of the first subset and the second subset, a social network data analysis technique, a topic modeling technique, and a cluster analysis technique, wherein the social network data analysis technique provides a first importance metric, the topic modeling technique provide a second importance metric, wherein the topic modeling technique is based, at least in part, on a natural language processing (NLP) methodology, and the cluster analysis technique provide a third importance metric, and the social network data analysis technique is based on social network data associated with one or more social network data sources that are distinct from the dataset, and the topic modeling technique and the cluster analysis technique are based on the dataset, determining an average priority level for each of the first subset and the second subset by averaging the first importance metric, the second importance metric, and the third importance metric, as each of those importance metrics are applied to each data unit in each respective subset, determining whether each of the first subset of data and the second subset of data meets an importance threshold, and determining that the first subset of data has a higher priority than the second subset of data based, at least in part, on a comparison of the average priority level for each of the first subset and the second subset; and performing the backup operation, wherein the backup operation comprises storing the first subset of data in the storage device prior to storing the second subset of data.

9. The non-transitory computer readable storage medium of claim 8, wherein the method further comprises the social network data analysis technique, the topic modeling technique, and the cluster analysis technique, are applied in order of the social network data analysis technique, the topic modeling technique, and the cluster analysis technique;

the importance threshold is based on a relative measure or an absolute measure; and in response to determining that the first subset of data does not meet the importance threshold, re-analyzing the dataset using any combination of the social network data analysis technique, the cluster analysis technique, and the topic modeling technique.

10. The non-transitory computer readable storage medium of claim 8, wherein the selecting the first subset of data from the dataset further comprises
  receiving information indicative of one or more results of analyzing the dataset from another computing device;
  determining that the information indicative of the one or more results is associated with at least a portion of the dataset; and
  deriving at least the first subset of data based on the information.

11. A system comprising:
one or more processors; and
a memory coupled to the one or more processors, wherein the memory stores program instructions executable by the one or more processors to perform a method comprising:
receiving, at a computing system, a request to perform a backup operation, wherein the request identifies a dataset to be backed up to a storage device;
selecting a first subset of data and a second subset of data from the dataset, wherein
  the first subset and the second subset each comprise a plurality of data units, and
  the selecting comprises
    analyzing the dataset by applying, to each of the first subset and the second subset, and a social network data analysis technique, a topic modeling technique, and a cluster analysis technique, wherein
      the social network data analysis technique provides a first importance metric,
      the topic modeling technique provide a second importance metric, wherein
        the topic modeling technique is based, at least in part, on a natural language processing (NLP) methodology, and
      the cluster analysis technique provide a third importance metric, and
      the social network data analysis technique is based on social network data associated with one or more social network data sources that are distinct from the dataset, and the topic modeling technique and the cluster analysis technique are based on the dataset,
    determining an average priority level for each of the first subset and the second subset by averaging the first importance metric, the second importance metric, and the third importance metric, as each of those importance metrics are applied to each data unit in each respective subset,
    determining whether each of the first subset of data and the second subset of data meets an importance threshold, and
    determining that the first subset of data has a higher priority than the second subset of data based, at least in part, on a comparison of the average priority level for each of the first subset and the second subset; and
perform the backup operation, wherein
  the backup operation comprises storing the first subset of data in the storage device prior to storing the second subset of data.

12. The system of claim 11, wherein
the selecting the first subset of data from the dataset further comprises
  receiving information indicative of one or more results of analyzing the dataset from another computing device;
  determining that the information indicative of the one or more results is associated with at least a portion of the dataset; and
  deriving at least the first subset of data based on the information.

\* \* \* \* \*